United States Patent
Abotabl et al.

(10) Patent No.: US 11,902,976 B2
(45) Date of Patent: Feb. 13, 2024

(54) RESOURCE AVAILABILITY AND RELIABILITY REPORTING FOR SIDELINK RESOURCE SELECTION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Seyedkianoush Hosseini, San Diego, CA (US); Wei Yang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 17/386,882

(22) Filed: Jul. 28, 2021

(65) Prior Publication Data
US 2023/0036477 A1 Feb. 2, 2023

(51) Int. Cl.
*H04W 72/20* (2023.01)
*H04W 72/542* (2023.01)

(52) U.S. Cl.
CPC ......... *H04W 72/20* (2023.01); *H04W 72/542* (2023.01)

(58) Field of Classification Search
CPC ............... H04W 8/20; H04W 36/0072; H04W 36/0094; H04W 72/02; H04W 72/20;
(Continued)

(56) References Cited

U.S. PATENT DOCUMENTS 9,112,884 B2 * 8/2015 Hernandez ............ H04W 76/14
9,693,338 B2    6/2017 Zhao et al.
2021/0329596 A1 * 10/2021 Freda .................. H04W 72/541

FOREIGN PATENT DOCUMENTS

KR    20210056326 A     5/2021
WO    WO-2019084816 A1 * 5/2019 ............ H04W 72/02
WO    WO-2020200603 A1   10/2020

OTHER PUBLICATIONS

Tang, "Method and Device for Terminal to Select Resource, and Computer Storage Medium," English Machine Translation of Tang (WO 2019/084816 A1), Clarivate Analytics, pp. 1-12 (Year: 2023).*

(Continued)

*Primary Examiner* — Thomas R Cairns
(74) *Attorney, Agent, or Firm* — Holland & Hart LLP

(57) ABSTRACT

Methods, systems, and devices for wireless communications are described. A user equipment (UE) may receive control signaling indicating a configuration for identifying availability and reliability of the availability for resources of a sidelink resource pool based on a plurality of signal quality thresholds. The UE may indicate, for each resource of a set of resources of the sidelink resource pool and based on the configuration, an indication of availability with respect to a first signal quality threshold and an indication of reliability of the availability with respect to a second signal quality threshold. The UE may select one or more resources of the sidelink resource pool based on the indication of availability and the indication of reliability of the availability for reach resource of the set of resources.

30 Claims, 10 Drawing Sheets

(58) Field of Classification Search
CPC ......... H04W 72/23–232; H04W 72/25; H04W 72/27; H04W 72/29; H04W 72/40; H04W 72/54–542; H04W 92/18; H04W 72/04; H04W 72/12; H04W 72/21
See application file for complete search history.

(56) References Cited

OTHER PUBLICATIONS

International Search Report and Written Opinion—PCT/US2022/073418—ISA/EPO—dated Sep. 23, 2022.

* cited by examiner

US 11,902,976 B2

RESOURCE AVAILABILITY AND RELIABILITY REPORTING FOR SIDELINK RESOURCE SELECTION

FIELD OF TECHNOLOGY

The following relates to wireless communications, including resource availability and reliability reporting for sidelink resource selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may support sidelink communications between wireless devices. For example, a user equipment (UE) may communicate with other UEs via a sidelink channel. In some examples, the UE may perform a sensing procedure to determine occupied or available resources for sidelink communications with the other UEs over a sidelink communication link.

SUMMARY

The described techniques relate to improved methods, systems, devices, and apparatuses that support resource availability and reliability reporting for sidelink resource selection. Generally, the described techniques provide for a sidelink user equipment (UE) to select resources from a sidelink resource pool based on information related to the availability and reliability of the resources, such as a measured signal quality with respect to multiple signal quality thresholds. The UE may receive a configuration to use in identifying or otherwise determining an availability for each resource of a set of resources in the resource pool, for example, with respect to a first signal quality threshold (e.g., a reference signal received power (RSRP) threshold). For instance, the UE may determine that a resource is available if the resource has a signal quality that satisfies (e.g., falls below) the first signal quality threshold. The UE may additionally identify or otherwise determine a reliability of the availability with respect to one or more other signal quality thresholds. As an example, the UE may determine that an available resource (e.g., that satisfies the first signal quality threshold) satisfies (e.g., falls below) a second signal quality threshold but fails to satisfy (e.g., falls above) a third signal quality threshold.

The UE may indicate an indication of the availability and an indication of the reliability of the availability, for instance, from a lower layer of the UE to an upper layer of the UE, and may select one or more resources of the resource pool based on the availability and the reliability of the availability. In some examples, the indication of the availability and the indication of the reliability may include a signal quality measurement for each resource of the set of resources. The upper layer of the UE may select (e.g., uniformly at random or according to a configured selection rule) resources from the set of resources to use in sidelink communications. In some cases, the upper layer may select resources from those resources that were indicated as being available, or from those resources with a highest indication of reliability, or some combination thereof.

A method for wireless communications at a UE is described. The method may include receiving control signaling indicating a configuration for identifying availability and reliability of the availability for resources of a sidelink resource pool based on a set of multiple signal quality thresholds, indicating, for each resource of a set of resources of the sidelink resource pool and based on the configuration, an indication of availability with respect to a first signal quality threshold of the set of multiple signal quality thresholds and an indication of reliability of the availability with respect to at least a second signal quality threshold of the set of multiple signal quality thresholds, and selecting one or more resources of the sidelink resource pool based on the indication of availability and the indication of reliability of the availability for each resource of the set of resources.

An apparatus for wireless communications at a UE is described. The apparatus may include a processor, memory coupled with the processor, and instructions stored in the memory. The instructions may be executable by the processor to cause the apparatus to receive control signaling indicating a configuration for identifying availability and reliability of the availability for resources of a sidelink resource pool based on a set of multiple signal quality thresholds, indicate, for each resource of a set of resources of the sidelink resource pool and based on the configuration, an indication of availability with respect to a first signal quality threshold of the set of multiple signal quality thresholds and an indication of reliability of the availability with respect to at least a second signal quality threshold of the set of multiple signal quality thresholds, and select one or more resources of the sidelink resource pool based on the indication of availability and the indication of reliability of the availability for each resource of the set of resources.

Another apparatus for wireless communications at a UE is described. The apparatus may include means for receiving control signaling indicating a configuration for identifying availability and reliability of the availability for resources of a sidelink resource pool based on a set of multiple signal quality thresholds, means for indicating, for each resource of a set of resources of the sidelink resource pool and based on the configuration, an indication of availability with respect to a first signal quality threshold of the set of multiple signal quality thresholds and an indication of reliability of the availability with respect to at least a second signal quality threshold of the set of multiple signal quality thresholds, and means for selecting one or more resources of the sidelink resource pool based on the indication of availability and the indication of reliability of the availability for each resource of the set of resources.

A non-transitory computer-readable medium storing code for wireless communications at a UE is described. The code may include instructions executable by a processor to receive control signaling indicating a configuration for identifying availability and reliability of the availability for resources of a sidelink resource pool based on a set of multiple signal quality thresholds, indicate, for each resource of a set of resources of the sidelink resource pool and based on the configuration, an indication of availability with respect to a first signal quality threshold of the set of multiple signal quality thresholds and an indication of reliability of the availability with respect to at least a second signal quality threshold of the set of multiple signal quality thresholds, and select one or more resources of the sidelink resource pool based on the indication of availability and the indication of reliability of the availability for each resource of the set of resources.

In some examples of the method, apparatuses, and non-transitory computer-readable medium described herein, the indicating may include operations, features, means, or instructions for indicating a two bit indicator for each resource of the set of resources, where a first bit of the two bit indicator includes the indication of availability and a second bit of the two bit indicator includes the indication of reliability of the availability.

Some examples of the method, apparatuses, and non-transitory computer-readable medium described herein may further include operations, features, means, or instructions for measuring, for each resource of the set of resources, a signal quality measurement, where the indication of availability and the indication of reliability of the availability for each resource of the set of resources may be based on the signal quality measurement.

In some examples of the method, apparatuses, and non-transitory computer-readable medium described herein, the indicating may include operations, features, means, or instructions for indicating the signal quality measurement for each resource of the set of resources, where the signal quality measurement indicates the availability and the reliability of the availability for each resource of the set of resources.

Some examples of the method, apparatuses, and non-transitory computer-readable medium described herein may further include operations, features, means, or instructions for identifying, from the sidelink resource pool, a set of available resources based on the first signal quality threshold, where the set of resources of the sidelink resource pool include the set of available resources, and where the indication of availability and the indication of reliability of the availability for the set of resources both indicate a reliability of the availability for each resource of the set of available resources.

Some examples of the method, apparatuses, and non-transitory computer-readable medium described herein may further include operations, features, means, or instructions for identifying, from the sidelink resource pool, a set of available resources based on the first signal quality threshold.

In some examples of the method, apparatuses, and non-transitory computer-readable medium described herein, the selecting the one or more resources may include operations, features, means, or instructions for determining a quantity of the set of available resources and selecting the one or more resources from the set of available resources based on the quantity of the set of available resources and the resource quantity parameter.

In some examples of the method, apparatuses, and non-transitory computer-readable medium described herein, selecting the one or more resources may include operations, features, means, or instructions for selecting the one or more resources uniformly at random from the set of available resources.

In some examples of the method, apparatuses, and non-transitory computer-readable medium described herein, selecting the one or more resources may include operations, features, means, or instructions for identifying, from the set of available resources, a subset of resources having a highest indication of reliability and selecting the one or more resources uniformly at random from the subset of resources.

In some examples of the method, apparatuses, and non-transitory computer-readable medium described herein, the configuration indicates an RSRP value for each signal quality threshold of the set of multiple signal quality thresholds.

In some examples of the method, apparatuses, and non-transitory computer-readable medium described herein, the configuration indicates an RSRP value for at least one signal quality threshold of the set of multiple signal quality thresholds and an offset value for a remaining set of signal quality thresholds of the set of multiple signal quality thresholds.

In some examples of the method, apparatuses, and non-transitory computer-readable medium described herein, the indicating may include operations, features, means, or instructions for reporting the indication of availability and the indication of reliability of the availability from a lower layer of the UE to a higher layer of the UE.

In some examples of the method, apparatuses, and non-transitory computer-readable medium described herein, the control signaling includes radio resource control (RRC) signaling.

DETAILED DESCRIPTION

Figure 1:
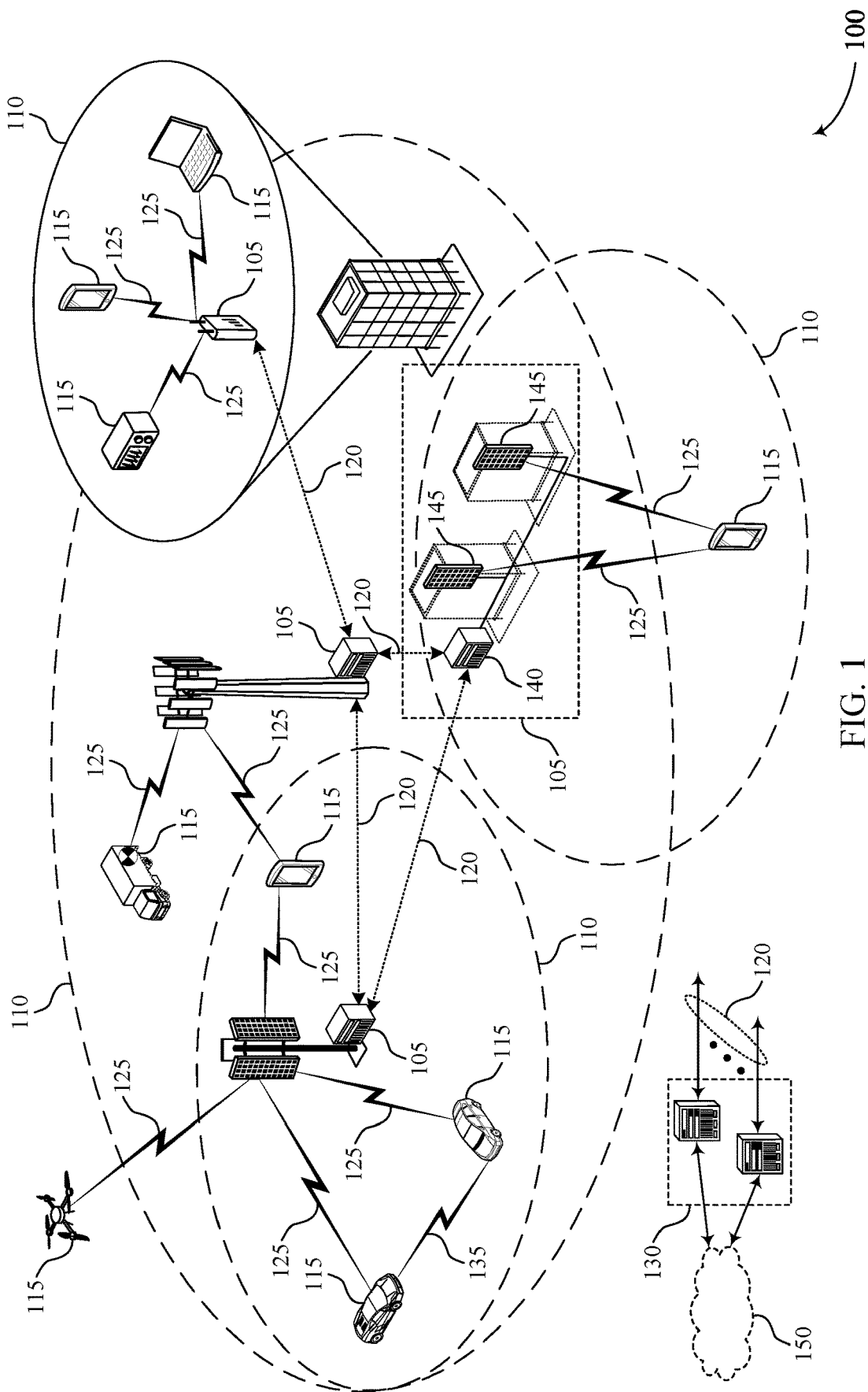
FIGS. 1 and 2 illustrate examples of wireless communications systems that support resource availability and reliability reporting for sidelink resource selection in accordance with aspects of the present disclosure.

Some wireless communications systems may support sidelink communications such that user equipment (UEs) may communicate with each other over a sidelink channel.

UEs communicating via sidelink may operate in a mode that determines how resources (e.g., time resources, frequency resources) are selected for sidelink communications. For example, a UE operating in a first mode (e.g., mode 1) may have an active connection with a base station and the base station may indicate, via control information (e.g., downlink control information (DCI)), resources for the UE to use. Alternatively, the UE may operate in a second mode (e.g., mode 2) and may self-select resources. For example, a UE may perform a channel sensing procedure (e.g., during a sensing window) to sense a set (e.g., a pool) of resources and determine which, if any, resources are available. During the sensing procedure, the UE may receive and decode control signals (e.g., sidelink control information (SCI)) transmitted by other UEs, which may indicate scheduling information and/or reserved or occupied resources. The UE may also measure reference signal(s) received power (RSRP) of the resources and may compare the measured RSRP to a threshold value to determine resource availability. The UE may select resources (e.g., by uniform, random selection) from the available resources during a resource selection window, and may use the selected resources to perform sidelink transmissions.

However, performing a sensing procedure may consume significant power, and a UE operating in a mode 2 may need to perform sensing before any transmission. Further, resource selection may be based on limited information about the resources. For example, a lower layer of the UE may indicate, to an upper layer of the UE, that each resource of the pool of resources is either available or unavailable (e.g., based on a single signal quality threshold). However, some available resources may have a lower measured signal quality than other available resources and may be more reliable (i.e., less likely to experience interference). Due to the binary nature of the indication, the lower layer may be incapable of conveying any additional resource information to the upper layer, and the upper layer may not select the most efficient resources.

Thus, as described herein, UEs communicating via a sidelink communication link may determine additional availability information about sidelink resources in order to more efficiently and accurately perform resource selection. The UE may determine, for each resource (e.g., of a set of resources of a sidelink resource pool), an availability of the resource and a reliability of the availability. The reliability of the availability, for example, may indicate an RSRP of the resource in relation to multiple RSRP thresholds. As an example, a first resource and a second resource may both be available (e.g., may satisfy a first RSRP threshold), but the second resource may have a measured RSRP that corresponds to a weaker signal strength. In the context of resource selection, a weaker signal strength indicates that a message transmitted on the resource may be less likely to experience interference. The second resource may therefore have a higher reliability of availability as compared to the first resource. Indicating this information to the upper layer of the UE may enable the upper layer to more efficiently select resources for sidelink communications. For instance, the upper layer may select resources from the resources indicated as having a highest reliability.

According to the techniques described herein, the UE may receive (e.g., from a base station or another sidelink UE) a configuration to use in identifying availability and reliability of availability for resources of a sidelink resource pool, for example, based on multiple signal quality thresholds. The UE may identify availability and reliability of the availability for each resource of a set of resources of the sidelink resource pool, e.g., with respect to the multiple signal quality thresholds. In some examples, the configuration may include an indication of one or more RSRP values for the multiple signal quality thresholds; in other examples, the configuration may indicate an RSRP value for at least one RSRP threshold and an offset value for one or more additional RSRP thresholds (e.g., of the multiple signal quality thresholds). The UE (e.g., a lower layer of the UE) may indicate (e.g., to an upper layer of the UE) the availability and the reliability of the availability for each resource of the set of resources with respect to one or more of the signal quality thresholds, respectively. In some examples, the indication may include a signal quality measurement for each of the resources, at least one bit for the indication of availability and at least one bit for the indication of reliability, or some combination thereof.

Selection of the resources may be performed based on the indications of availability and reliability of the availability. For instance, the upper layer of the UE may determine a set of available resources based on the indications of availability and may select resources from the set of available resources based on the indications of reliability of the availability. In some examples, the configuration may indicate a resource quantity parameter and the UE may determine a quantity of the available resources. When the quantity of available resources is less than the resource quantity parameter, the UE may select from the available resources; when the quantity of available resources is greater than the resource quantity parameter, the UE may identify a subset of resources that have a highest indicated reliability, and may select resources from the subset of resources.

Aspects of the disclosure are initially described in the context of wireless communications systems. Aspects of the disclosure are then explained with reference to a threshold diagram and a resource selection procedure. Aspects of the disclosure are further illustrated by and described with reference to apparatus diagrams, system diagrams, and flowcharts that relate to resource availability and reliability reporting for sidelink resource selection.

FIG. 1 illustrates an example of a wireless communications system 100 that supports resource availability and reliability reporting for sidelink resource selection in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, two UEs 115 may communicate with each other via a communication link 135 (e.g., a sidelink or a sidelink communication link). In such cases, for example, a first UE 115 may receive one or more sidelink transmissions from a second UE 115 over a sidelink channel, which may include one or both of a sidelink control channel or a sidelink data channel. For example, the first UE 115 may receive a first part of SCI (which may be referred to herein as SCI-1) over a sidelink control channel, such as a physical sidelink control channel (PSCCH), and a second part of SCI (which may be referred to herein as SCI-2) and data over a sidelink data channel, such as a physical sidelink shared channel (PSSCH). The SCI-1 may include PSSCH bandwidth information and resource reservations for future slots.

In some deployment scenarios, such as in cellular V2X (C-V2X) deployments or industrial IoT deployments, the first UE 115 and the second UE 115 may determine or otherwise identify a resource allocation for communications between the first UE 115 and the second UE 115 (which may be carried over a PC5 link) according to various modes. In a first mode (e.g., mode 1), for example, a serving base station 105 may assign the transmission resources for sidelink communications between the first UE 115 and the second UE 115 through downlink control information (DCI). In a second mode, the first UE 115 and/or the second UE 115 may autonomously (i.e., without signaling from the base station 105) select resources for sidelink communications between the first UE 115 and the second UE 115.

For example, in the second mode, the first UE 115 and the second UE 115 may each perform a resource selection procedure to determine which resources of a sidelink resource pool are available to use for respective sidelink transmissions. Such a resource pool may include a number of subchannels over a number of slots and may be shared among a number of UEs 115. The first UE 115 may perform channel sensing, for example, based on blind decoding PSCCH channels to determine or otherwise identify which resources of the resource pool are reserved by other sidelink transmissions and are therefore not available for selection. Additionally, or alternatively, the first UE 115 may determine which resources are available by measuring a signal quality (e.g., a reference signal receive power (RSRP)) of decoded SCI (e.g., received via PSCCH) and comparing the measured signal quality to a configured threshold RSRP; if the measured signal quality is below the threshold, for example, the resource may be available for selection, while if the measured signal quality is above the threshold, the resource may be unavailable (e.g., may be in use or reserved by another UE).

The first UE 115 may perform sensing on a lower layer, such as a Physical layer (e.g., a PHY layer), and may report (i.e., indicate) whether a given resource is available or unavailable to an upper layer (e.g., a medium access control (MAC) layer). The upper layer may select resources to use for a sidelink transmission to the second UE 115 based on the report. For example, the upper layer may randomly select from the resources indicated as available using a uniform distribution. Uniform distribution selection may reduce the likelihood that multiple UEs 115 select the same available resources, which may in turn reduce the probability of collisions between the multiple UEs 115. For instance, the second UE 115 may also perform a channel sensing procedure and select from the available resources according to a uniform distribution.

According to the techniques described herein, UEs 115 operating in a sidelink communications system may determine and indicate (i.e., report) additional information about the availability of a given resource, which may enable a UE 115 to more efficiently and accurately select resources for a sidelink transmission. That is, in addition to indicating whether a given resource is available or unavailable (e.g., according to a single signal quality threshold), the lower layer may report other information, such as an indication of an RSRP measurement of the resource, an indication of reliability of the availability with respect to one or more signal quality thresholds, etc. This additional information may enable the upper layer to discern between available resources and thereby more efficiently select from the available resources for an upcoming transmission. For instance, the UE 115 may determine that a first resource satisfies a first signal quality threshold and is therefore available. The first resource may satisfy an additional, second signal quality threshold that indicates that the first resource is associated with a relatively weak signal; a weak signal may mean that other UEs 115 using the first resource are not close enough to the UE 115 to cause interference, and the UE 115 may transmit on the first resource without conflict. In comparison, while a second resource may satisfy the first signal quality threshold and may therefore be available, the second resource may fail to satisfy the second signal quality threshold. Thus, although both resources are available for selection, the second resource may be associated with increased interference when compared to the first resource, such that selecting the first resource may increase reliability of the associated transmission.

The lower layer may indicate, to the upper layer, the availability and reliability for a given resource with respect to the corresponding thresholds. Continuing the above example, the lower layer may report, to the upper layer, an indication that the first resource is available and an indication of reliability of the availability (e.g., that the availability of the first resource is relatively high) based on the signal quality thresholds. The lower layer may report an indication that the second resource is available and an indication that the reliability of the availability is relatively low, e.g., that the second resource failed to satisfy the second threshold. The upper layer may select from the available resources based on the indications of availability and reliability of the availability for each resource. For instance, the upper layer may select from a subset of available resources, where the subset includes available resources that have a highest indication of reliability. Selection may be performed using a uniform distribution, a non-uniform distribution, a learning algorithm, or the like. The UE 115 may transmit a sidelink transmission (e.g., via a sidelink communication link 135) to another sidelink UE 115 using the selected resource(s).

Figure 2:
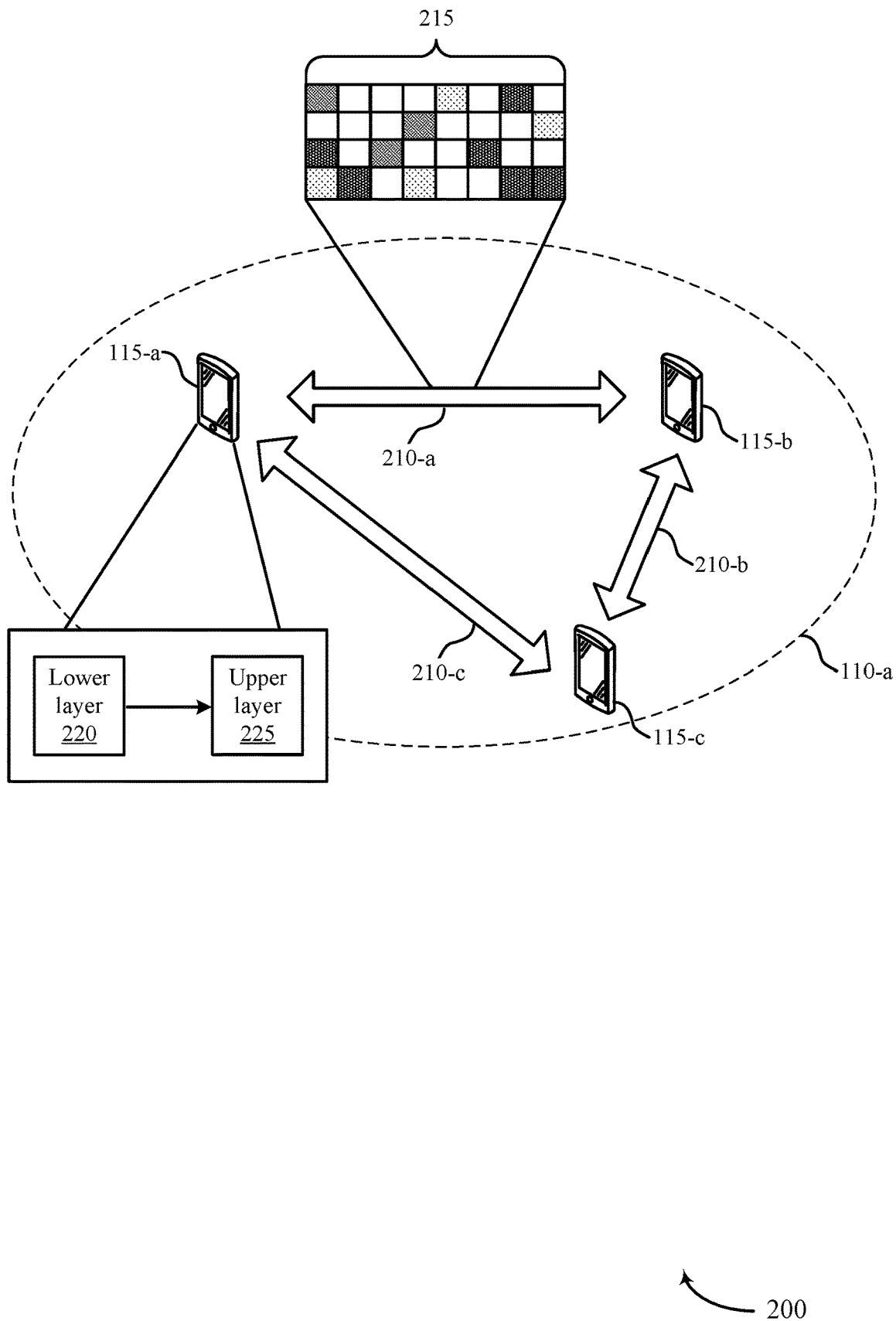

FIG. 2 illustrates an example of a wireless communications system 200 that supports resource availability and reliability reporting for sidelink resource selection in accordance with aspects of the present disclosure. The wireless communications system 200 may implement aspects of the wireless communications system 100. For example, the wireless communications system 200 may include a coverage area 110-a and UEs 115-a, 115-b, and 115-c, which may be examples of the corresponding devices described herein. The UEs 115 may communicate with one another via sidelinks 210 (e.g., sidelink communication links). The sidelink communications may be referred to as device-to-device (D2D) communications, vehicle-to-vehicle (V2V) communications, vehicle-to-everything (V2X) communications, or the like.

The UEs 115 in FIG. 2 may operate in a mode 2 for sidelink communications. In mode 2, the UEs 115 may autonomously (e.g., without signaling from a base station) select resources from a resource pool, such as resource pool 215, for the sidelink communications. For example, the UE 115-a may perform channel sensing based on blind decoding PSCCH channels to determine or otherwise identify which resources of the resource pool 215 are reserved by other sidelink transmissions. The resource pool 215 may include a number of subchannels over a number of slots and may be shared among the UEs 115. The UE 115-a (e.g., in addition to the UE 115-b and the UE 115-c) may perform a channel sensing procedure, during a sensing window, over the set of resources to determine occupied (e.g., unavailable) or candidate (e.g., available) resources to use for sidelink transmissions. For example, some subchannels may be reserved for use by the other UEs 115 or may experience relatively high levels of interference such that, even if the UE 115-a transmits a message over those subchannels, a receiving UE 115 would have a relatively low likelihood of successfully receiving and decoding the message.

The UE 115-a may perform the channel sensing procedure by decoding SCI to identify the occupied or available sidelink resources. In the example of FIG. 2, each SCI received by the UE 115-a may be broadcast by a respective UE 115 (e.g., UE 115-a may broadcast an SCI, UE 115-b may broadcast an SCI, UE 115-c may broadcast an SCI, and so forth) and may indicate sidelink resources reserved by the respective UE 115. The sensing may be performed by a first layer, such as a lower layer 220 (e.g., a PHY layer), of a protocol stack of the UE 115-a, for example, by decoding scheduling information included in the SCI(s). The UE 115-a (e.g., the lower layer 220 of the UE 115-a) may receive the SCI during a sensing window and may use the information included in the SCI to identify or otherwise determine available resources, e.g., resources that are not indicated as being reserved in the SCI(s).

Additionally, or alternatively, the UE 115-*a* (e.g., the lower layer 220 of the UE 115-*a*) may determine which resources of the resource pool 215 are available by measuring a signal quality (e.g., an RSRP) for each resource (e.g., of a set of resources, which may be less than a total number of resources of the resource pool 215). The UE 115-*a* may compare the RSRP for each resource with a threshold, such as a configured signal quality threshold (e.g., a threshold RSRP value). For instance, if the RSRP for a given resource satisfies the threshold (e.g., is lower than the threshold), that resource may be considered an available resource. In some examples, the UE 115-*a* may determine the RSRP threshold such that the RSRP threshold enables a percentage of candidate resources. For example, if, according to a first RSRP threshold, the quantity of available resources is less than the percentage, the UE 115-*a* may increase the RSRP threshold value to a second RSRP threshold. The UE 115-*a* may increase the RSRP threshold until the quantity of available resources (e.g., resources that fall below the second RSRP threshold) is be greater than or equal to the percentage.

Based on the results of the sensing procedure (i.e., based on identifying candidate resources), the lower layer 220 of the UE 115-*a* may report, to an upper layer 225 of the UE 115-*a*, whether each resource of the set of resources is available or unavailable. The UE 115-*a* (e.g., the upper layer 225 of the UE 115-*a*) may select resources from the available resources to use for transmitting one or more sidelink transmissions, for instance, during a resource selection window.

However, performing channel sensing may be power-intensive, especially as a UE 115 may perform the sensing procedure and select resources before every transmission. Additionally, not all of the available resources may be equally reliable for a transmission. That is, although a signal quality of a resource may satisfy the threshold such that the resource is considered as available, the signal quality may be relatively strong (e.g., as compared to other available resources), which may increase the likelihood of encountering interference when transmitting on the resource.

According to the techniques described herein, a UE 115 (e.g., the UE 115-*a*) may determine additional information about resources of a resource pool (e.g., the resource pool 215) and may select resources for sidelink transmissions based on the additional information. The UE 115-*a* may receive a configuration for identifying availability and a reliability of the availability for the resources of the resource pool 215. The configuration may include or may be based on multiple signal quality thresholds. For example, the configuration may indicate an RSRP value for each signal quality threshold of the multiple signal quality thresholds. Additionally, or alternatively, the configuration may indicate an RSRP value for at least one of the signal quality thresholds, and may indicate an offset value, from which the UE 115-*a* may determine the remaining signal quality thresholds.

The UE 115-*a* (e.g., the lower layer 220 of the UE 115-*a*) may determine an availability and a reliability of the availability for each resource of a set of resources of the resource pool 215, where the set of resources may be less than or equal to all of the resources of the resource pool 215. For example, a first signal quality threshold (e.g., of the multiple signal quality thresholds) may be for determining whether a given resource is available or unavailable. Based on the channel sensing procedure (e.g., based on decoding SCI and/or measuring a signal quality) as described herein, the UE 115-*a* may compare the RSRP value of the resource to the first signal quality threshold; if the RSRP value satisfies (e.g., falls below) the first signal quality threshold, the UE 115-*a* may determine that the resource is available. If the RSRP value fails to satisfy (e.g., falls above) the first signal quality threshold, the UE 115-*a* may determine that the resource is unavailable.

The UE 115-*a* may utilize at least a second signal quality threshold to determine the reliability of the availability. For instance, the second signal quality threshold may be associated with an RSRP value that is lower than the first signal quality threshold. The UE 115-*a* may compare the RSRP value of the resource to the second signal quality threshold. If the RSRP value satisfies (e.g., falls below) the second signal quality threshold, the UE 115-*a* may determine that the resource is reliable or otherwise determine a measure of reliability of the availability (e.g., that the reliability of the availability is greater than if the RSRP value was greater than the second signal quality threshold but less than the first signal quality threshold); if the RSRP value does not satisfy the second signal quality threshold, the UE 115-*a* may determine that the resource is relatively unreliable.

The lower layer 220 of the UE 115-*a* may indicate, to the upper layer 225, an indication of the availability and an indication of the reliability of each resource of a set of resources of the resource pool 215. As an example, based on the first and second signal quality thresholds, respectively, the lower layer may indicate that the resource is available, and that the reliability is high. In some instances, the indication may include two bits, where a value of the first bit may indicate availability, and a value of the second bit may indicate reliability. If the UE 115-*a* measured a signal quality for the resource (e.g., during the channel sensing procedure), the indication may be based on or may include the signal quality measurement (e.g., the RSRP value).

In some cases, the lower layer 220 may report the indication(s) for available resources only. That is, the UE 115-*a* may identify or otherwise determine, based on the first signal quality threshold, a set of resources that are available. The lower layer 220 may indicate, for each resource of the set of available resources, a reliability of the availability. For instance, in such examples, if a two-bit indication is used, both bits may indicate a measure a reliability of availability since all indicated resources are already understood to be available.

The UE 115-*a* (e.g., the upper layer 225 of the UE 115-*a*) may select resources (e.g., during a resource selection window) based on the indications from the lower layer 220. For example, the upper layer 225 may select resources from the resources indicated as being available, and may refrain from selecting resources from those that are indicated as being unavailable. In some cases, the upper layer 225 may select from the resources that are indicated as being available and as being reliable or having a relatively high reliability of availability. In examples where the lower layer 220 reports indications for only available resources, the upper layer 225 may select resources based on the indicated reliability of the availability of the resources.

In some examples, the configuration may include a resource quantity parameter n that the UE 115-*a* may utilize in resource selection. The UE 115-*a* (e.g., the upper layer 225 of the UE 115-*a*) may determine a quantity of the set of available resources. If the quantity is greater than or equal to the resource quantity parameter n, the UE 115-*a* may determine a subset of resources that have a highest indication of reliability, and may select resources from this subset. In some cases, the subset may include the n most reliable resources (e.g., the quantity of the subset may be equal to n).

If the quantity is less than the resource quantity parameter n, the UE 115-a may select resources from the set of available resources. That is, other nearby UEs 115 (e.g., the UE 115-b and the UE 115-c) that are also performing channel sensing and resource selection procedures may obtain similar results for availability and reliability of the resources in the resource pool 215. Thus, if the quantity of available resources—and subsequently the quantity of the most reliable resources—is relatively low (i.e., less than the resource quantity parameter n), the likelihood that the UEs 115-a, 115-b, and 115-c select the same (e.g., most reliable) resource(s) may increase. As such, selecting from the set of available resources may reduce the probability of collision between the UEs 115.

Based on the resource selection procedure, the UE 115-a may transmit a sidelink transmission to the UE 115-b and/or the UE 115-c via the corresponding sidelink 210.

Figure 3A:
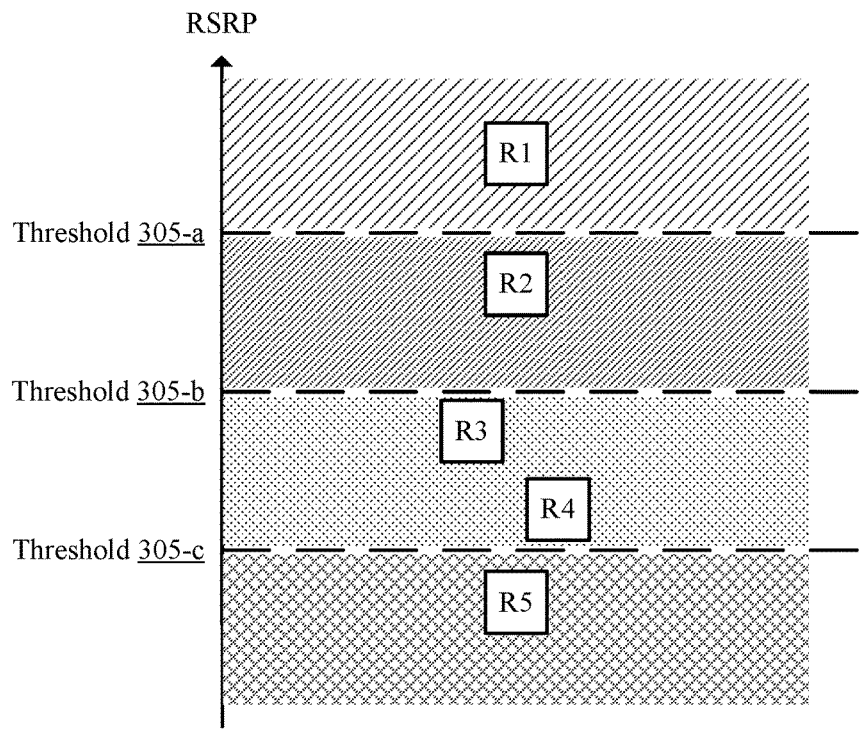
FIGS. 3A and 3B illustrate examples of threshold configurations that support resource availability and reliability reporting for sidelink resource selection in accordance with aspects of the present disclosure.
Figure 3B:
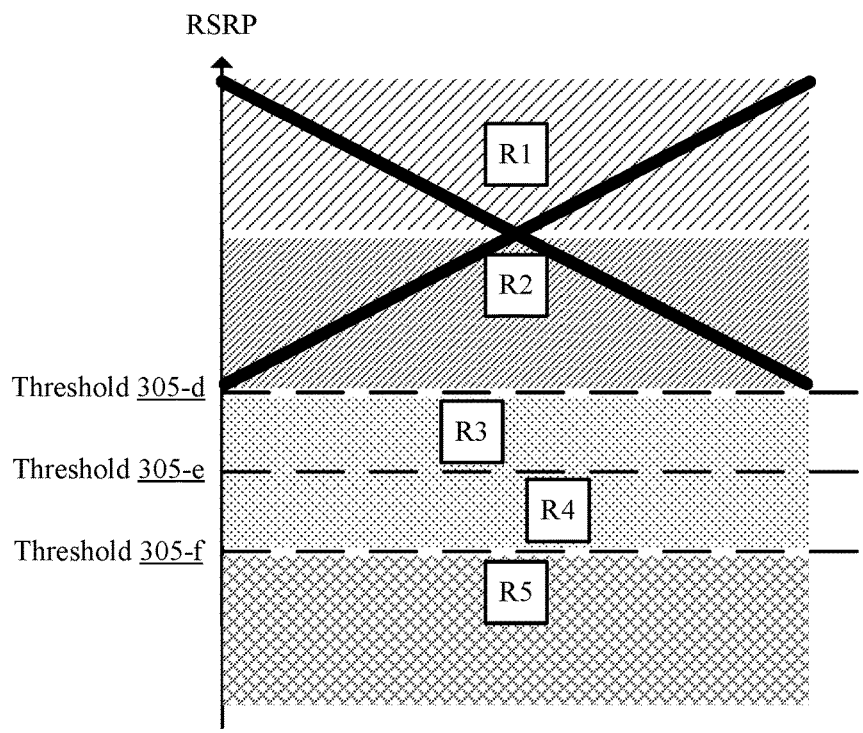

FIGS. 3A and 3B illustrate examples of threshold configurations 301 and 302, respectively, that support resource availability and reliability reporting for sidelink resource selection in accordance with aspects of the present disclosure. The threshold configurations 301 and 302 may implement aspects of the wireless communications system 100 and the wireless communications system 200, as described in FIGS. 1 and 2. For example, the threshold configurations 301 and 302 may be implemented by a UE (e.g., a UE 115) to support resource selection in a sidelink communications system according to the techniques described herein.

Each of the threshold configurations 301 and 302 may include multiple thresholds 305, which may be examples of signal quality thresholds. For instance, as described with reference to FIG. 2, a UE may receive (e.g., via control signaling, such as RRC signaling) a configuration for identifying availability and reliability of the availability for resources of a sidelink resource pool, where the configuration indicates (e.g., implicitly or explicitly) an RSRP value for each threshold 305 (e.g., a plurality of signal quality thresholds 305). During a channel sensing procedure, a lower layer of the UE may determine an availability and a reliability of the availability, with respect to one or more of the thresholds 305, for each resource of a set of resources of the sidelink resource pool. For example, the UE may measure a signal quality of each of the resources R1, R2, R3, R4, and R5, and may compare the signal quality to the thresholds 305. Using the multiple thresholds 305, the UE may determine an availability of each resource (e.g., by comparing each resource to one of the thresholds 305) and a measure of reliability of the availability (e.g., by comparing each resource to one or more additional thresholds 305). The multiple thresholds 305 may provide more granularity of information (e.g., from a lower layer to an upper layer of the UE), than if the UE was configured with only a single threshold.

The lower layer may report (e.g., indicate) an indication of the availability and an indication of the reliability of the availability to an upper layer of the UE. In some examples, the lower layer may report the indications for each resource of the set of resources of the sidelink resource pool; in other examples, the lower layer may report the indications for only those resources of the set of resources that are identified as being available. The upper layer of the UE may, during a resource selection window, select resources for a sidelink transmission based on the indications. For instance, as described with reference to FIG. 2, the upper layer may select from all available resources of the set of resources or may select from a subset of the available resources, where the subset includes those resources indicated as most reliable (e.g., having a highest indication of reliability).

In the example of FIG. 3A, the threshold configuration 301 includes a threshold 305-a, a threshold 305-b, and a threshold 305-c. The UE may perform a signal quality measurement for resources R1, R2, R3, R4, and R5, and may determine (e.g., based on the configuration) an availability and a reliability of the availability for each resource with respect to the thresholds 305. For example, the threshold 305-b may be for determining availability, and the thresholds 305-a and 305-c may be for determining reliability of the availability.

As illustrated, the resource R1 and the resource R2 may each have signal quality measurements that fail to satisfy the threshold 305-b. The UE may therefore determine, in accordance with the configuration, that the resources R1 and R2 are unavailable for resource selection. Additionally, resource R2 may satisfy the threshold 305-a, while resource R1 may fail to satisfy the threshold 305-a. As such, the lower layer of the UE may be able to indicate some additional information that differentiates the signal quality of resource R1 and resource R2 other than that they are both unavailable. Accordingly, the lower layer of the UE may indicate, for resource R1, an indication that the resource R1 is unavailable with respect to the threshold 305-b, and that the reliability or confidence of the unavailability is high with respect to the threshold 305-a. In this example, a high reliability of unavailability (or stated alternatively, a low reliability of availability) may imply that the resource R1 has the relatively highest RSRP and is therefore the least available resource, e.g., of the set of resources. The lower layer of the UE may indicate, for resource R2, an indication that the resource R2 is unavailable with respect to the threshold 305-b and that the reliability of the availability is higher with respect to the threshold 305-a.

The resources R3, R4, and R5, in FIG. 3A, may satisfy the threshold 305-b and may therefore be available for resource selection. The resource R5 may additionally satisfy the threshold 305-c. Thus, the lower layer of the UE may indicate that resources R3 and R4 are available with respect to the threshold 305-b; however, as they fail to satisfy the threshold 305-c, the lower layer may indicate that the reliability or confidence of the availability is lower with respect to the threshold 305-c. The lower layer may indicate that resource R5 is available with respect to the threshold 305-b and that the reliability of the availability is higher with respect to the threshold 305-c (e.g., the reliability indication may indicate that resource R5 is the most available resource, even among the other available resources).

The upper layer may receive the indications from the lower layer and may select resources from the resource pool based on the indications. In some examples, the upper layer may randomly select from among the available resources (e.g., resources R3, R4, and R5), while in other examples, the upper layer may select from the most reliably available resources of the available resources. For instance, the upper layer may select the resource R5, as the resource R5 has a highest indication of availability as compared to the resources R3 and R4.

FIG. 3B illustrates an example of a threshold configuration 302 in which the lower layer of the UE may only report indications for resources that are available, for example, instead of reporting indications for all resources of the sidelink resource pool (i.e., resources that are available and resources that are unavailable). The UE may identify or otherwise determine a set of available resources of the sidelink pool based on a first threshold 305 (e.g., threshold 305-*d*), and may determine a reliability of the availability for each of the set of available resources based on one or more second thresholds 305 (e.g., thresholds 305-*e* and 305-*f*). In some examples, if the quantity of the set of available resources fails to satisfy a configured percentage of available resources, the UE may increase a threshold 305; for example, as described with reference to FIG. 2, the UE may increase a threshold 305 until the quantity of the set of available resources satisfies the percentage.

As illustrated in FIG. 3B, the resources R1 and R2 may be unavailable, as they fail to satisfy the threshold 305-*d*. In this example, the lower layer of the UE may refrain from reporting indications associated with either R1 or R2. Instead, the lower layer may only explicitly indicate reliability of the availability for the resources R3, R4, and R5 with respect to the thresholds 305-*d*, 305-*e*, and 305-*f*. That is, in the example of FIG. 3B, any indications associated with resources R3, and R4, and R5 would imply that these resources are available (e.g., fall below threshold 305-*d*), and as such the indications may instead provide a higher granularity of reliability (e.g., as compared to configuration 301 where some of the thresholds were used to indicate unavailable resources). The resource R3 may satisfy the threshold 305-*d* but may fail to satisfy the threshold 305-*e*; the resource R4 may satisfy the threshold 305-*d* and the threshold 305-*e* but may fail to satisfy the threshold 305-*f*; and the resource R5 may satisfy all of the thresholds 305. The lower layer may indicate that the resource R3 has the lowest reliability of availability with respect to the threshold 305-*d* and as compared with the threshold 305-*e*. Similarly, the lower layer may indicate that the resource R4 has a higher reliability of availability with respect to the threshold 305-*e* but has a lower reliability of availability with respect to the threshold 305-*f*, and that the resource R5 has a highest reliability of availability with respect to the threshold 305-*f*.

In some examples, the indication of the availability and the indication of the reliability of the availability may be indicated via a two bit indicator, such that a first bit corresponds to the indication of the availability and a second bit corresponds to the indication of the reliability. For instance, a value of a most significant bit (MSB) may indicate the availability and a value of a least significant bit (LSB) may indicate the reliability. In some examples, a value of 1 for the first bit may indicate that a resource is not available whereas a value of 0 for the first bit may indicate that a resource is available. Similarly, a value of 1 for the second bit may indicate a higher reliability in the availability (or unavailability), whereas a value of 0 for the second bit may indicate a lower reliability of the availability (or unavailability). In the example of FIG. 3A, the indication associated with R1 may include two bits; because R1 is not available and the reliability of the unavailability is high (i.e., the measured RSRP value is above threshold 305-*a*), the value of each bit in the indication may be set to 1 (e.g., [11]). As another example, the indication associated with R2 may be [10], because the first bit still indicates that the resource is unavailable, but the second bit indicates the reliability in the unavailability is less than it was for resource R1 (i.e., the measured RSRP value is between threshold 305-*b* and threshold 305-*a*). Continuing with this example, resources R3 and R4 may be indicated using the two-bit indicator [00], which indicates that both resources are available, but that the reliability of the availability is relatively lower (i.e., the measured RSRP value falls between threshold 305-*b* and threshold 305-*c*). Lastly, resource R5 may be indicated using the two-bit indicator [01], which indicates that the resource is available, and the reliability of the availability is relatively high (i.e., the measured RSRP value is below threshold 305-*c*).

In the example of FIG. 3B, because the indicated resources are all available (e.g., because the UE determines which resources have RSRP values below 305-*d* and only indicates availability for those resources to higher layers), the indication may not need to explicitly indicate availability, but instead can use both bits (or however many bits are being used) to indicate the reliability of the availability, for instance, with respect to different thresholds 305. For example, the indication associated with resource R3 may be [10], the indication associated with R4 may be [11], the indication associated with resource R5 may be [00], and so forth. In this example, because the first bit is not needed to indicate availability, the combination of the two bits may indicate relative reliability of the availability, where the second bit indicates relatively availability with respect to the first bit (e.g., [11] is more reliably available than [10] and [01] is more reliably available than [00], where all resources with a first bit of 0 or more available than resources with a first bit of 1). It should be understood that the bit combinations described herein are examples for illustrative purposes, and other combinations may be used to indicate availability and a measure of reliability of the availability.

Determining and indicating additional resource information (e.g., indications of availability and reliability of the availability) according to the techniques described herein may increase efficiency and accuracy in resource selection at the UE. For example, conveying additional information about a signal quality measurement of each resource (in other words, whether the resource satisfies each threshold 305) may enable the UE to further differentiate between resources and select resources according to this higher granularity of availability information during the resource selection window. Increasing a quantity of the thresholds 305 may further enable the UE to determine which of the available resources are the most available (or least available) for transmission. That is, as the quantity of thresholds 305 increases, the resolution of the additional information conveyed from the lower layer to the upper layer may also increase.

In the example of FIG. 3A, the quantity of thresholds 305 is three, enabling four levels of resolution. Put another way, a signal quality measurement of a resource may fall into one of four boundary regions, where the boundary regions are separated by the three thresholds 305. Additionally, as illustrated in FIG. 3B, reporting indications for only resources that are available (e.g., having a signal quality measurement that satisfies the threshold 305-*d*) may further increase the resolution. That is, the thresholds 305 in the threshold configuration 302 may be within a smaller range of RSRP values (e.g., only RSRP values that are associated with resource availability) as compared to the thresholds 305 in the threshold configuration 301; thus, the level of resolution may be increased while the quantity of thresholds 305 remains the same. Accordingly, in the example of FIG. 3B, the lower layer of the UE may convey more information about the resources R3 and R4 than in the example of FIG. 3A. For instance, in FIG. 3A, the resource R3 and the resource R4 are associated with a same indication of reliability, such that the upper layer of the UE may randomly select between the resource R3 and the resource R4. Alternatively, in FIG. 3B, the resource R3 may be associated with a higher level of reliability than the resource R4, and the upper layer may select R3 (e.g., instead of R4).

In some cases, the indication(s) reported by the lower layer may include a quantity of bits that is based on the resolution and/or the quantity of thresholds 305. For instance, the quantity of bits used for the indication(s) may increase as the quantity of configured thresholds 305 increases. As an example, x levels of resolution may utilize $\log_2(x)$ bits and $\log_2(x)-1$ thresholds 305. As illustrated in FIG. 3A, the threshold configuration 301 provides four levels of resolution using three thresholds 305; according to this example, the indication may include two bits.

In some other cases, the indication(s) may include a signal quality (e.g., RSRP) measurement for each resource; in such examples, the quantity of bits in the indication may not be dependent on the quantity of thresholds 305, and the quantity of bits for this indication may be greater than two bits. In such examples, because the actual RSRP measurement is directly indicated to the higher layers, the indication of availability and the reliability of the availability is implied in or can otherwise be determined from the RSRP measurement value. Additionally, in such examples, the lower layer of the UE may not be configured with a percentage of available resources to meet. That is, because the lower layer may indicate the RSRP value(s) for each resource to the upper layer, the upper layer may have sufficient information to perform resource selection. Accordingly, during the channel sensing procedure, the lower layer may not need to iteratively increase a signal quality threshold to satisfy a percentage of available resources.

Figure 4:
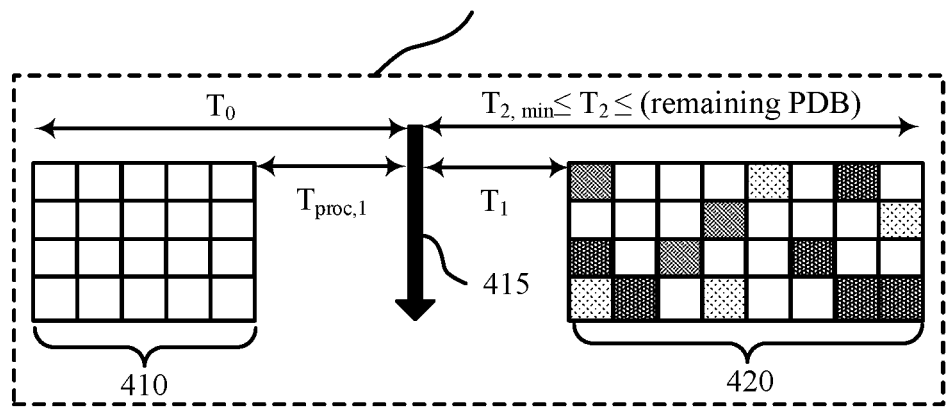
FIG. 4 illustrates an example of resource selection procedure that supports resource availability and reliability reporting for sidelink resource selection in accordance with aspects of the present disclosure.

FIG. 4 illustrates an example of a resource selection procedure 400 that supports resource availability and reliability reporting for sidelink resource selection in accordance with aspects of the present disclosure. In some examples, the resource selection procedure 400 may implement aspects of the wireless communications system 100 and the wireless communications system 200, as described in FIGS. 1 and 2. The resource selection procedure 400 may be implemented by a UE (e.g., a UE 115) to support resource selection in a sidelink communications system according to the techniques described herein. For example, the UE may select resources from a sidelink resource pool during the resource selection procedure 400 based on a reported availability and reliability of the availability associated with the resources.

The resource selection procedure 400 may include a frame structure 405, which may include a sensing window 410, a resource selection trigger 415, and a resource selection window 420. With reference to FIG. 2, a UE may monitor a control channel (e.g., a sidelink control channel) to receive and decode control signals during the sensing window 410. Upon receiving the resource selection trigger 415 (e.g., a data packet received $T_{proc,1}$ after the resource selection window 420 and $T_1$ before the resource selection window 420), the UE may select and reserve resources 425 within the resource selection window 420 for sidelink communication with another UE. The sensing window 410 may be configured to span a duration $T_0$.

As described with reference to FIG. 2, during the sensing window 410, the UE may perform channel sensing (e.g., sidelink channel sensing) by decoding SCI to identify the occupied or available sidelink resources. For example, the UE may receive SCI from multiple other UEs indicating sidelink resources reserved by the respective UE. Additionally, or alternatively, the UE may determine an RSRP for each resource of the set of resources and may compare the RSRP for each resource with a threshold RSRP. If the RSRP for a given resource satisfies the threshold (e.g., is lower than an RSRP threshold), that resource may be considered an available resource. The sensing may be performed by a lower layer, such as a PHY layer, of a protocol stack of the UE, for example, by decoding scheduling information included in the SCI(s).

The PHY layer may obtain parameters for performing the channel sensing from a higher protocol stack layer (e.g., an upper layer) of the UE, such as a MAC layer of the protocol stack. The PHY layer may sense the one or more allocated subsets of frequency resources during the sensing window 410 in accordance with the obtained parameters. It is to be understood that while the examples herein describe a PHY layer and a MAC layer, the same examples may also apply to any other layers of a protocol stack without departing from the scope of the present disclosure. For example, the examples described herein may apply to a PHY layer and an RRC layer, or to a MAC layer and an RRC layer, among other examples. In some cases, for example, a MAC layer may receive information from or report information to other upper layers, such as the RRC layer, which may impact resource selection.

The UE may receive (e.g., as part of control signaling) a configuration for identifying availability and reliability of the availability for resources of the sidelink resource pool based on multiple signal quality thresholds (e.g., RSRP thresholds). The configuration may indicate an RSRP value for at least one of the signal quality thresholds. In some examples, the configuration may indicate an RSRP value for each of the signal quality thresholds, while in other examples, the configuration may indicate an offset value, from which the UE may determine the remaining signal quality thresholds. In some cases, the configuration may indicate a resource quantity parameter.

When performing sensing to identify available resources, the PHY layer may determine an availability of each resource (e.g., of a set of resources, which may be less than all resources) based on at least one of the signal quality thresholds. For instance, the PHY layer may determine that resources are unavailable (e.g., determine that resources are occupied) by decoding SCI (e.g., an SCI-1) and comparing an RSRP of the SCI (e.g., or an RSRP of an associated data channel, such as a PSSCH) to a first configured RSRP threshold. If the RSRP of the SCI (e.g., or PSSCH) exceeds the first RSRP threshold, the resources reserved by the SCI may be considered unavailable resources 435 (e.g., occupied resources). If the RSRP of the SCI (e.g., or the PSSCH) satisfies (e.g., falls below) the first RSRP threshold, the resources reserved by the SCI may be considered available resources (e.g., unoccupied resources, such as unoccupied resources 440). Resources not reserved by SCI may also be considered available. In the example of FIG. 4, available resources that are not selected during the resource selection window 420 (e.g., excluding the selected resources 425) may be considered unoccupied resources 440.

As described with reference to FIG. 3, the PHY layer may additionally determine, for each resource of the set of resources during the sensing window 410, a reliability of the availability, e.g., with respect to one or more second RSRP thresholds. For instance, the PHY layer may determine that a first resource that satisfies the first RSRP threshold (i.e., is available) also satisfies a second RSRP threshold; the PHY layer may therefore determine that the first resource has a high reliability of the availability. The PHY layer may determine that a second resource that satisfies the first RSRP threshold (i.e., is available) fails to satisfy the second RSRP threshold; the PHY layer may determine that the second resource has a low reliability of the availability. The PHY layer may determine that a third resource fails to satisfy the first RSRP threshold and the second RSRP threshold, and is therefore unavailable and has a low reliability of the availability.

The PHY layer may report or otherwise indicate, to an upper layer (e.g., the MAC layer), an indication of the availability and an indication of the reliability of the availability. In some examples, the PHY layer may report the indications for each resource of a set of resources of the sidelink pool, while in other examples, the PHY layer may only report indications for available resources. The MAC layer may select the selected resources 425 based on the indications and according to the techniques described herein in one or more time slots of the resource selection window 420. For example, the MAC layer may select resources from those indicated as available by the PHY layer. In some examples, the MAC layer may select resources from those indicated as available and as having a highest indication of reliability. In some cases, the MAC layer may select resources based on the resource quantity parameter indicated in the configuration.

For example, the PHY layer may identify a set of available resources and may indicate the availability to the MAC layer. The MAC layer may determine a quantity of the set of available resources and may select resources during the resource selection window 420 based on the quantity of the set of available resources and the resource quantity parameter. If the quantity of the set of available resources is less than the resource quantity parameter, the MAC layer may select resources (e.g., uniformly at random) from the set of available resources. If the quantity of the set of available resources is greater than or equal to the resource quantity parameter, the MAC layer may select resources based on the indicated reliability of the availability. For example, the MAC layer may identify a subset of the set of available resources, where the subset includes resources that have a highest indication of reliability, and may select resources (e.g., uniformly at random) from the subset. The subset may include a quantity of resources that is equal to the resource quantity parameter.

As a non-limiting example, the resource quantity parameter may have a value of 20. If the quantity of the set of available resources is 10, the MAC layer may select resources uniformly at random from the 10 available resources. Alternatively, if the quantity of the set of available resources is 50, the MAC layer may identify or otherwise determine the 20 resources (e.g., of the set of 50 available resources) that have the highest indication(s) of reliability. The MAC layer may then select resources uniformly at random from the 20 resources.

In some cases, the resource selection window 420 may span a duration $T_2$ bound by parameters $T_{2,min}$ and a remaining packet delay budget (PDB). A PDB may be configured by an upper layer of the UE and may indicate a delay budget for a data packet. The remaining PDB may therefore be a remaining amount of time before the data packet received at the resource selection trigger 415 may be transmitted on the selected resources 425. In other cases, the resource selection window 420 may span a duration $T_2$ that is independent of a PDB. For example, a UE performing channel sensing and resource selection according to a channel sensing schedule may be unaware of PDBs associated with other UEs; thus, the duration $T_2$ may not be related to any PDB. The duration $T_2$ may be fixed (e.g., preconfigured) or may be configured. In some examples, the duration $T_2$ may be at least 42 slots (e.g., as associated with an SCI-1 aperiodic reservation). In any case, the selected resources 425 may be reserved in units of subchannels within the resource selection window 420 and may be periodic or aperiodic in a time domain.

Figure 5:
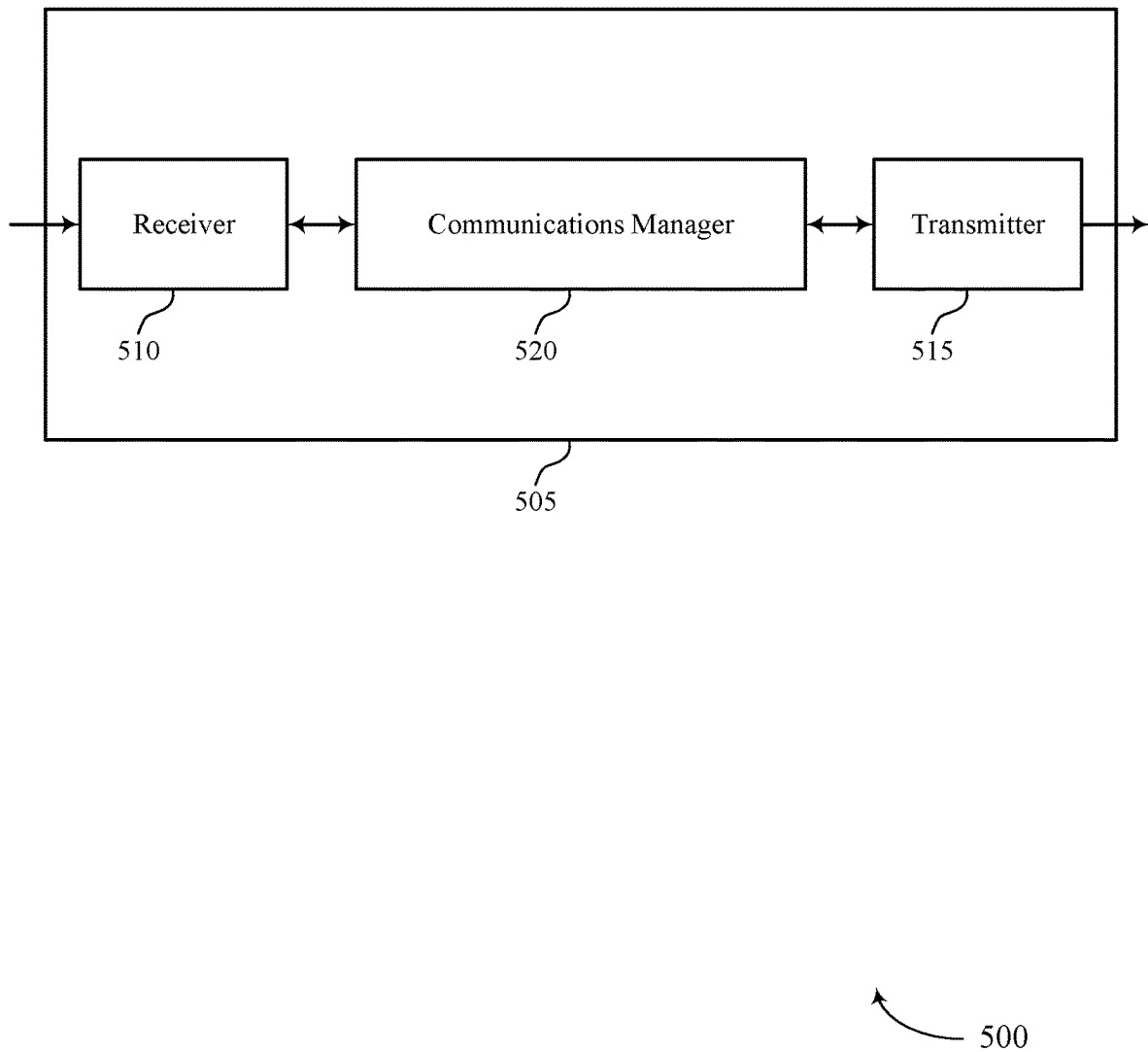
FIGS. 5 and 6 show block diagrams of devices that support resource availability and reliability reporting for sidelink resource selection in accordance with aspects of the present disclosure.

FIG. 5 shows a block diagram 500 of a device 505 that supports resource availability and reliability reporting for sidelink resource selection in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to resource availability and reliability reporting for sidelink resource selection). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to resource availability and reliability reporting for sidelink resource selection). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of resource availability and reliability reporting for sidelink resource selection as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving control signaling indicating a configuration for identifying availability and reliability of the availability for resources of a sidelink resource pool based on a set of multiple signal quality thresholds. The communications manager 520 may be configured as or otherwise support a means for indicating, for each resource of a set of resources of the sidelink resource pool and based on the configuration, an indication of availability with respect to a first signal quality threshold of the set of multiple signal quality thresholds and an indication of reliability of the availability with respect to at least a second signal quality threshold of the set of multiple signal quality thresholds. The communications manager 520 may be configured as or otherwise support a means for selecting one or more resources of the sidelink resource pool based on the indication of availability and the indication of reliability of the availability for each resource of the set of resources.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for increased efficiency and accuracy in sidelink resource selection. Conveying additional information about resource availability may enable an upper layer of the device 505 to more intelligently select between available resources. For instance, the upper layer may select an available resource associated with a relatively high indication of reliability, which may be less likely to experience interference. This reliability may extend to transmissions on the resource. Further, selecting more reliable resources may reduce the likelihood of retransmissions, which may conserve power at the device 505.

Figure 6:
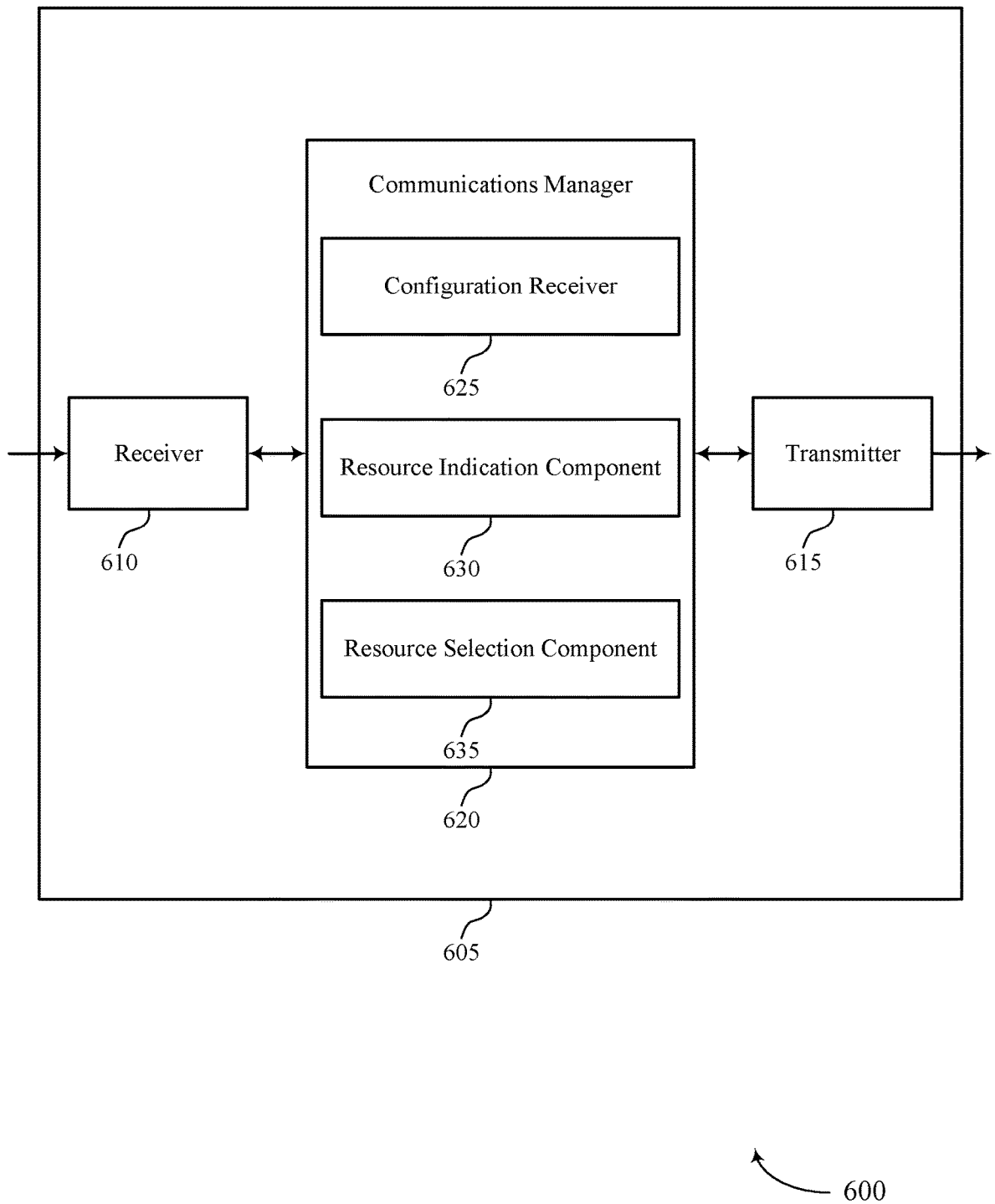

FIG. 6 shows a block diagram 600 of a device 605 that supports resource availability and reliability reporting for sidelink resource selection in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to resource availability and reliability reporting for sidelink resource selection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to resource availability and reliability reporting for sidelink resource selection). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of resource availability and reliability reporting for sidelink resource selection as described herein. For example, the communications manager 620 may include a configuration receiver 625, a resource indication component 630, a resource selection component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The configuration receiver 625 may be configured as or otherwise support a means for receiving control signaling indicating a configuration for identifying availability and reliability of the availability for resources of a sidelink resource pool based on a set of multiple signal quality thresholds. The resource indication component 630 may be configured as or otherwise support a means for indicating, for each resource of a set of resources of the sidelink resource pool and based on the configuration, an indication of availability with respect to a first signal quality threshold of the set of multiple signal quality thresholds and an indication of reliability of the availability with respect to at least a second signal quality threshold of the set of multiple signal quality thresholds. The resource selection component 635 may be configured as or otherwise support a means for selecting one or more resources of the sidelink resource pool based on the indication of availability and the indication of reliability of the availability for each resource of the set of resources.

Figure 7:
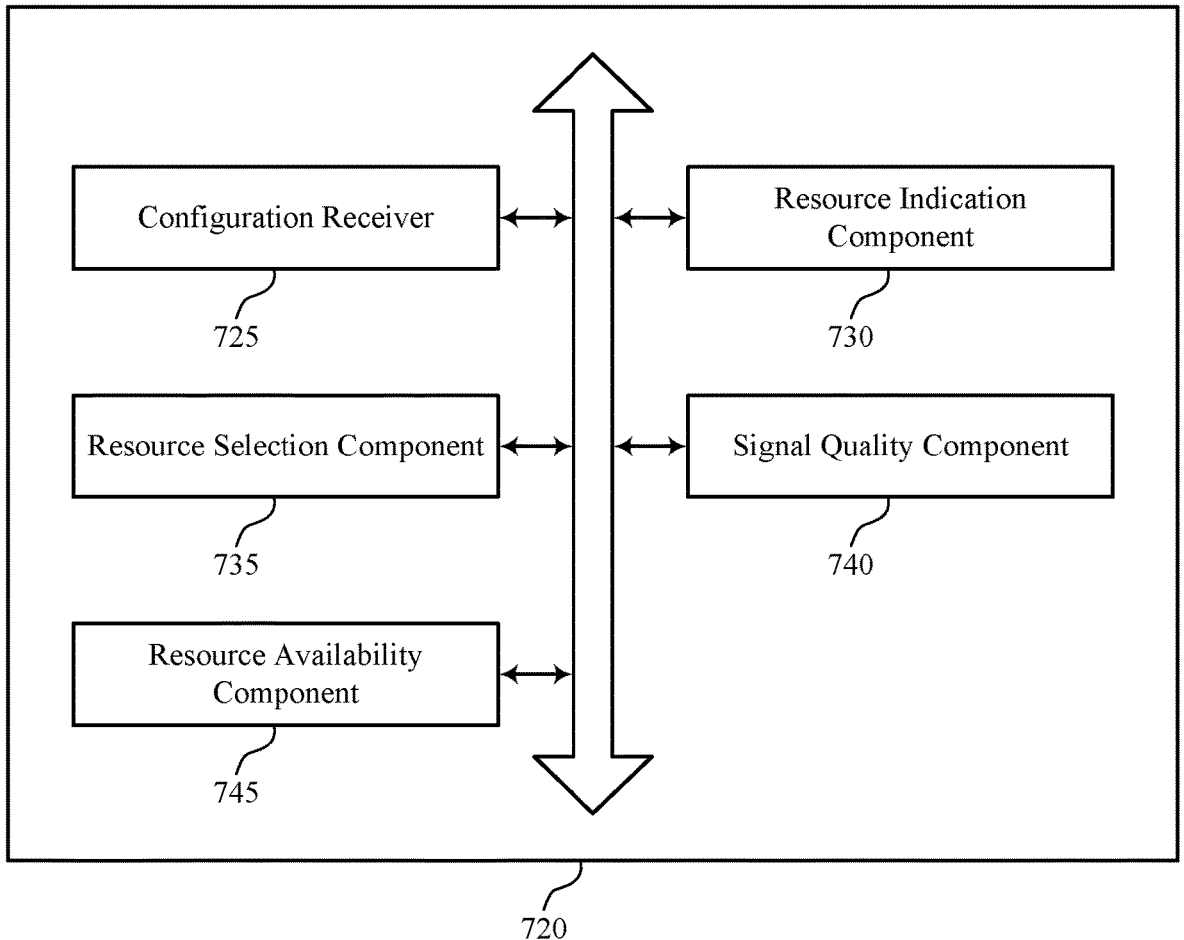
FIG. 7 shows a block diagram of a communications manager that supports resource availability and reliability reporting for sidelink resource selection in accordance with aspects of the present disclosure.

FIG. 7 shows a block diagram 700 of a communications manager 720 that supports resource availability and reliability reporting for sidelink resource selection in accordance with aspects of the present disclosure. The communications manager 720 may be an example of aspects of a communications manager 520, a communications manager 620, or both, as described herein. The communications manager 720, or various components thereof, may be an example of means for performing various aspects of resource availability and reliability reporting for sidelink resource selection as described herein. For example, the communications manager 720 may include a configuration receiver 725, a resource indication component 730, a resource selection component 735, a signal quality component 740, a resource availability component 745, or any combination thereof. Each of these components may communicate, directly or indirectly, with one another (e.g., via one or more buses).

The communications manager 720 may support wireless communications at a UE in accordance with examples as disclosed herein. The configuration receiver 725 may be configured as or otherwise support a means for receiving control signaling indicating a configuration for identifying availability and reliability of the availability for resources of a sidelink resource pool based on a set of multiple signal quality thresholds. The resource indication component 730 may be configured as or otherwise support a means for indicating, for each resource of a set of resources of the sidelink resource pool and based on the configuration, an indication of availability with respect to a first signal quality threshold of the set of multiple signal quality thresholds and an indication of reliability of the availability with respect to at least a second signal quality threshold of the set of multiple signal quality thresholds. The resource selection component 735 may be configured as or otherwise support a means for selecting one or more resources of the sidelink resource pool based on the indication of availability and the indication of reliability of the availability for each resource of the set of resources.

In some examples, to support the indicating, the resource indication component 730 may be configured as or otherwise support a means for indicating a two bit indicator for each resource of the set of resources, where a first bit of the two bit indicator includes the indication of availability and a second bit of the two bit indicator includes the indication of reliability of the availability.

In some examples, the signal quality component 740 may be configured as or otherwise support a means for measuring, for each resource of the set of resources, a signal quality measurement, where the indication of availability and the indication of reliability of the availability for each resource of the set of resources is based on the signal quality measurement.

In some examples, to support the indicating, the resource indication component 730 may be configured as or otherwise support a means for indicating the signal quality measurement for each resource of the set of resources, where the signal quality measurement indicates the availability and the reliability of the availability for each resource of the set of resources.

In some examples, the resource availability component 745 may be configured as or otherwise support a means for identifying, from the sidelink resource pool, a set of available resources based on the first signal quality threshold, where the set of resources of the sidelink resource pool include the set of available resources, and where the indication of availability and the indication of reliability of the availability for the set of resources both indicate a reliability of the availability for each resource of the set of available resources.

In some examples, the resource availability component 745 may be configured as or otherwise support a means for identifying, from the sidelink resource pool, a set of available resources based on the first signal quality threshold.

In some examples, to support selecting the one or more resources, the resource availability component 745 may be configured as or otherwise support a means for determining a quantity of the set of available resources. In some examples, to support selecting the one or more resources, the resource selection component 735 may be configured as or otherwise support a means for selecting the one or more resources from the set of available resources based on the quantity of the set of available resources and the resource quantity parameter.

In some examples, to support selecting the one or more resources, the resource selection component 735 may be configured as or otherwise support a means for selecting the one or more resources uniformly at random from the set of available resources.

In some examples, to support selecting the one or more resources, the resource availability component 745 may be configured as or otherwise support a means for identifying, from the set of available resources, a subset of resources having a highest indication of reliability. In some examples, to support selecting the one or more resources, the resource selection component 735 may be configured as or otherwise support a means for selecting the one or more resources uniformly at random from the subset of resources.

In some examples, the configuration indicates an RSRP value for each signal quality threshold of the set of multiple signal quality thresholds. In some examples, the configuration indicates an RSRP value for at least one signal quality threshold of the set of multiple signal quality thresholds and an offset value for a remaining set of signal quality thresholds of the set of multiple signal quality thresholds.

In some examples, to support indicating, the resource indication component 730 may be configured as or otherwise support a means for reporting the indication of availability and the indication of reliability of the availability from a lower layer of the UE to a upper layer of the UE.

In some examples, the control signaling includes RRC signaling.

Figure 8:
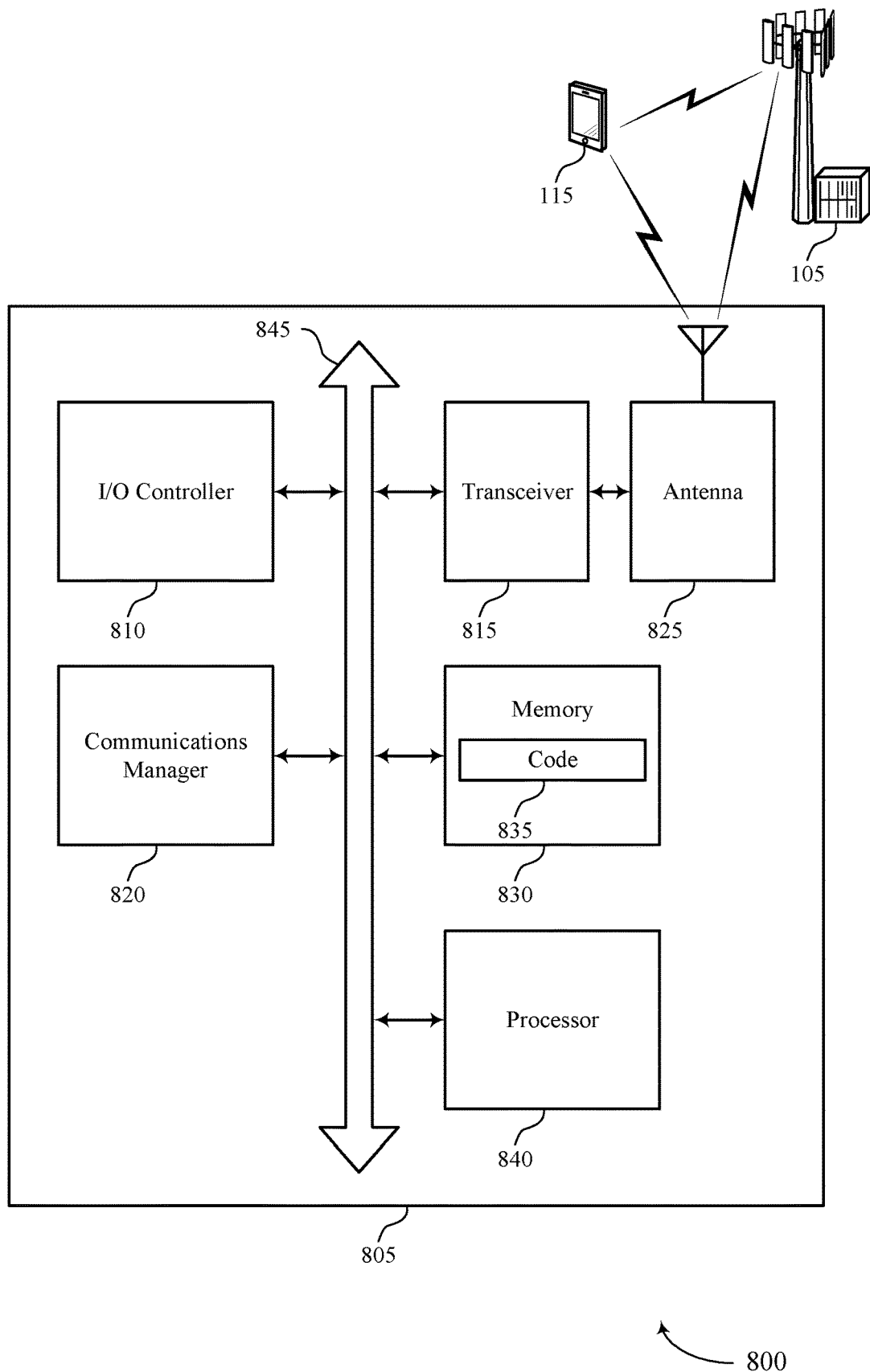
FIG. 8 shows a diagram of a system including a device that supports resource availability and reliability reporting for sidelink resource selection in accordance with aspects of the present disclosure.

FIG. 8 shows a diagram of a system 800 including a device 805 that supports resource availability and reliability reporting for sidelink resource selection in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting resource availability and reliability reporting for sidelink resource selection). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving control signaling indicating a configuration for identifying availability and reliability of the availability for resources of a sidelink resource pool based on a set of multiple signal quality thresholds. The communications manager 820 may be configured as or otherwise support a means for indicating, for each resource of a set of resources of the sidelink resource pool and based on the configuration, an indication of availability with respect to a first signal quality threshold of the set of multiple signal quality thresholds and an indication of reliability of the availability with respect to at least a second signal quality threshold of the set of multiple signal quality thresholds. The communications manager 820 may be configured as or otherwise support a means for selecting one or more resources of the sidelink resource pool based on the indication of availability and the indication of reliability of the availability for each resource of the set of resources.

By including or configuring the communications manager 820 in accordance with examples as described herein, the device 805 may support techniques for increased efficiency and accuracy in sidelink resource selection. For example, the device 805 may transmit sidelink messages on resources that are associated with a high reliability and are less likely to experience interference. Increasing reliability of transmissions may in turn increase system throughput and reduce latency, as the likelihood of retransmissions decreases.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of resource availability and reliability reporting for sidelink resource selection as described herein, or the processor 840 and the memory 830 may be otherwise configured to perform or support such operations.

Figure 9:
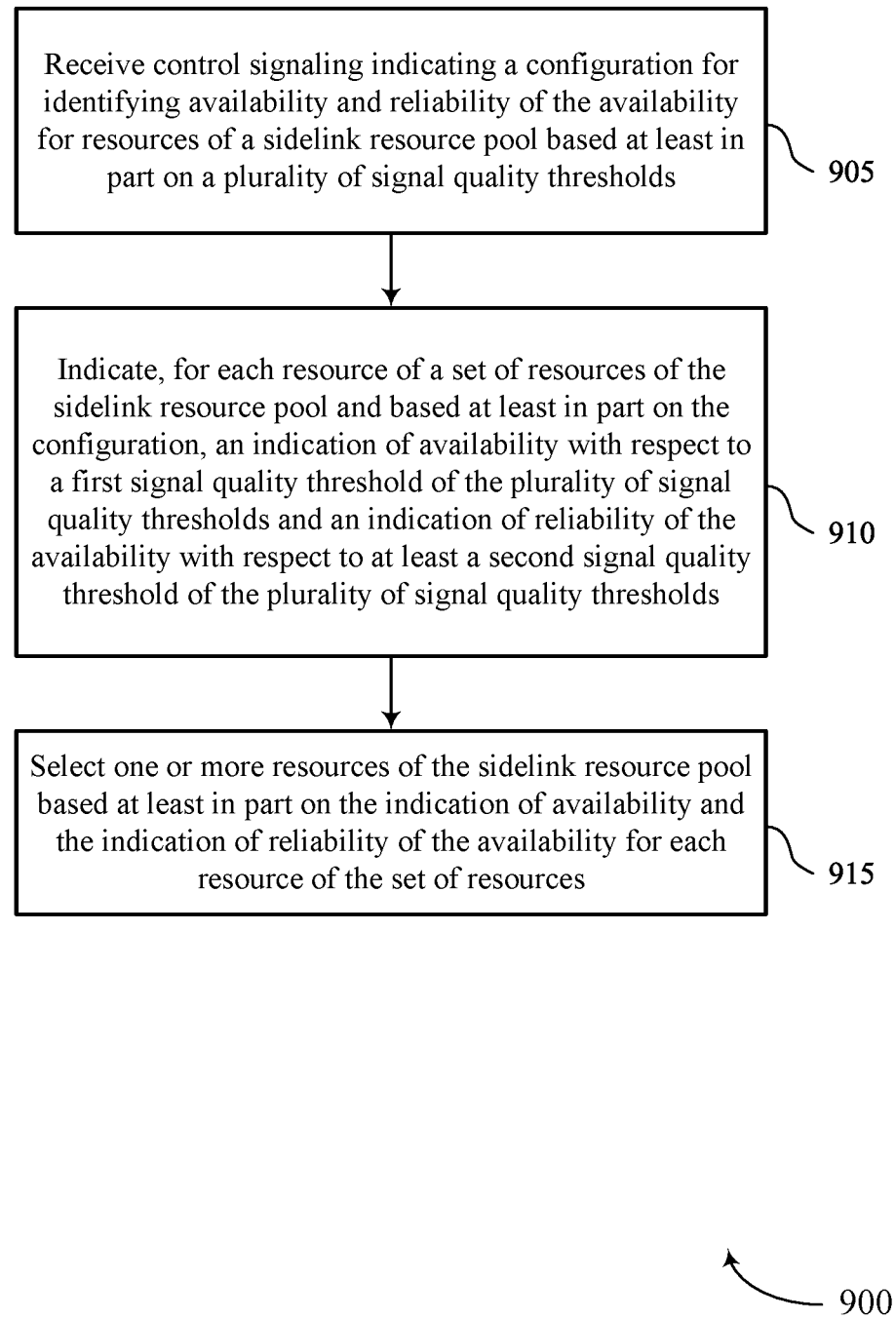
FIGS. 9 and 10 show flowcharts illustrating methods that support resource availability and reliability reporting for sidelink resource selection in accordance with aspects of the present disclosure.

FIG. 9 shows a flowchart illustrating a method 900 that supports resource availability and reliability reporting for sidelink resource selection in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving control signaling indicating a configuration for identifying availability and reliability of the availability for resources of a sidelink resource pool based on a set of multiple signal quality thresholds. The operations of 905 may be performed in accordance with examples as disclosed herein. In some examples, aspects of the operations of 905 may be performed by a configuration receiver 725 as described with reference to FIG. 7.

At 910, the method may include indicating, for each resource of a set of resources of the sidelink resource pool and based on the configuration, an indication of availability with respect to a first signal quality threshold of the set of multiple signal quality thresholds and an indication of reliability of the availability with respect to at least a second signal quality threshold of the set of multiple signal quality thresholds. The operations of 910 may be performed in accordance with examples as disclosed herein. In some examples, aspects of the operations of 910 may be performed by a resource indication component 730 as described with reference to FIG. 7.

At 915, the method may include selecting one or more resources of the sidelink resource pool based on the indication of availability and the indication of reliability of the availability for each resource of the set of resources. The operations of 915 may be performed in accordance with examples as disclosed herein. In some examples, aspects of the operations of 915 may be performed by a resource selection component 735 as described with reference to FIG. 7.

Figure 10:
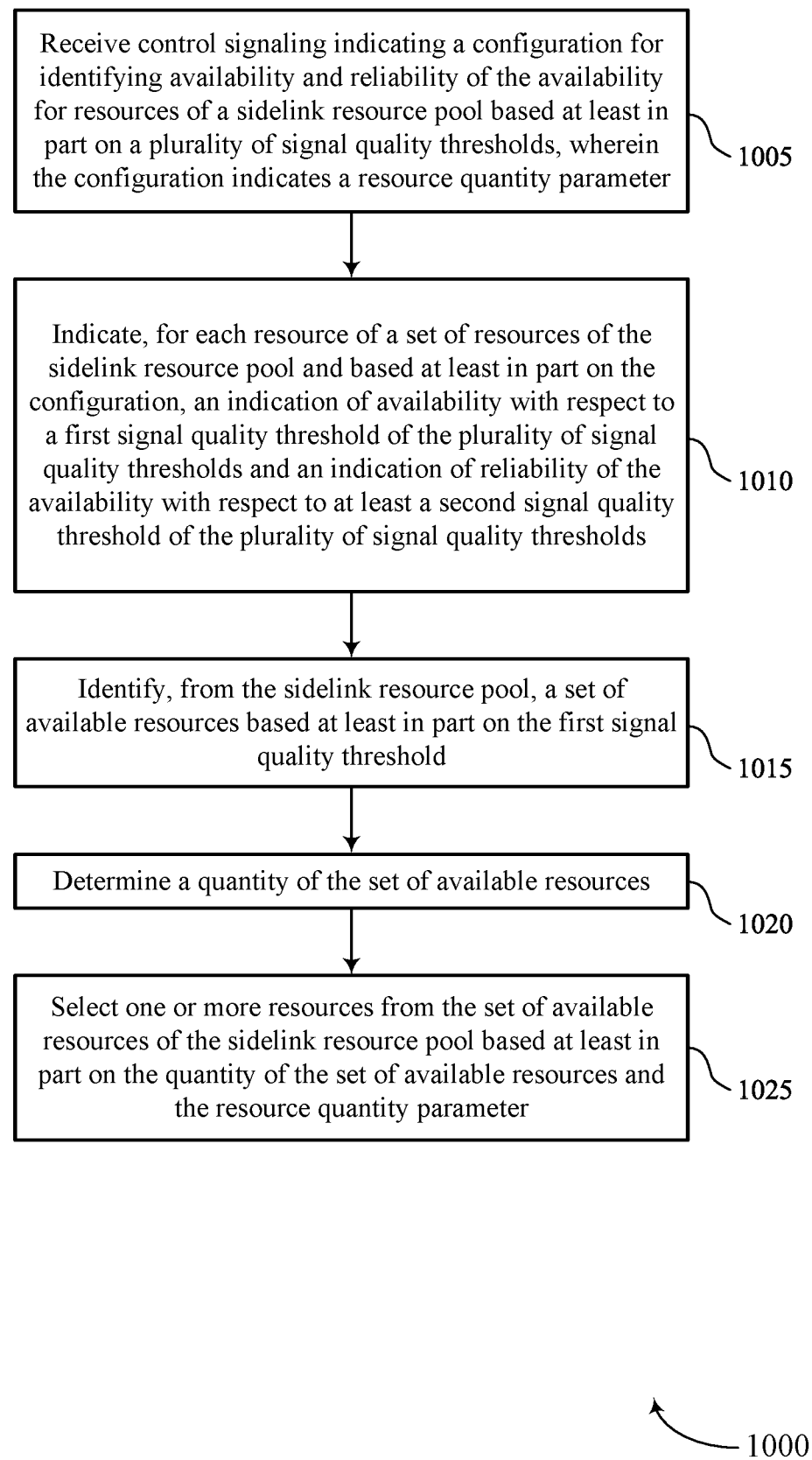

FIG. 10 shows a flowchart illustrating a method 1000 that supports resource availability and reliability reporting for sidelink resource selection in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving control signaling indicating a configuration for identifying availability and reliability of the availability for resources of a sidelink resource pool based on a set of multiple signal quality thresholds. The operations of 1005 may be performed in accordance with examples as disclosed herein. In some examples, aspects of the operations of 1005 may be performed by a configuration receiver 725 as described with reference to FIG. 7.

At 1010, the method may include indicating, for each resource of a set of resources of the sidelink resource pool and based on the configuration, an indication of availability with respect to a first signal quality threshold of the set of multiple signal quality thresholds and an indication of reliability of the availability with respect to at least a second signal quality threshold of the set of multiple signal quality thresholds, where the configuration indicates a resource quantity parameter. The operations of 1010 may be performed in accordance with examples as disclosed herein. In some examples, aspects of the operations of 1010 may be performed by a resource indication component 730 as described with reference to FIG. 7.

At 1015, the method may include identifying, from the sidelink resource pool, a set of available resources based on the first signal quality threshold. The operations of 1015 may be performed in accordance with examples as disclosed herein. In some examples, aspects of the operations of 1015 may be performed by a resource availability component 745 as described with reference to FIG. 7.

At 1020, the method may include determining a quantity of the set of available resources. The operations of 1020 may be performed in accordance with examples as disclosed herein. In some examples, aspects of the operations of 1020 may be performed by a resource availability component 745 as described with reference to FIG. 7.

At 1025, the method may include selecting the one or more resources from the set of available resources of the sidelink pool based on the quantity of the set of available resources and the resource quantity parameter. The operations of 1025 may be performed in accordance with examples as disclosed herein. In some examples, aspects of the operations of 1025 may be performed by a resource selection component 735 as described with reference to FIG. 7.

The following provides an overview of aspects of the present disclosure:

Aspect 1: A method for wireless communications at a UE, comprising: receiving control signaling indicating a configuration for identifying availability and reliability of the availability for resources of a sidelink resource pool based at least in part on a plurality of signal quality thresholds; indicating, for each resource of a set of resources of the sidelink resource pool and based at least in part on the configuration, an indication of availability with respect to a first signal quality threshold of the plurality of signal quality thresholds and an indication of reliability of the availability with respect to at least a second signal quality threshold of the plurality of signal quality thresholds; and selecting one or more resources of the sidelink resource pool based at least in part on the indication of availability and the indication of reliability of the availability for each resource of the set of resources.

Aspect 2: The method of aspect 1, wherein the indicating further comprises: indicating a two bit indicator for each resource of the set of resources, wherein a first bit of the two bit indicator comprises the indication of availability and a second bit of the two bit indicator comprises the indication of reliability of the availability.

Aspect 3: The method of any of aspects 1 through 2, further comprising: measuring, for each resource of the set of resources, a signal quality measurement, wherein the indication of availability and the indication of reliability of the availability for each resource of the set of resources is based at least in part on the signal quality measurement.

Aspect 4: The method of aspect 3, wherein the indicating further comprises: indicating the signal quality measurement for each resource of the set of resources, wherein the signal quality measurement indicates the availability and the reliability of the availability for each resource of the set of resources.

Aspect 5: The method of any of aspects 1 through 4, further comprising: identifying, from the sidelink resource pool, a set of available resources based at least in part on the first signal quality threshold, wherein the set of resources of the sidelink resource pool comprise the set of available resources, and wherein the indication of availability and the indication of reliability of the availability for the set of resources both indicate a reliability of the availability for each resource of the set of available resources.

Aspect 6: The method of any of aspects 1 through 5, further comprising: identifying, from the sidelink resource pool, a set of available resources based at least in part on the first signal quality threshold.

Aspect 7: The method of aspect 6, wherein the configuration indicates a resource quantity parameter, and wherein the selecting the one or more resources further comprises: determining a quantity of the set of available resources; and selecting the one or more resources from the set of available resources based at least in part on the quantity of the set of available resources and the resource quantity parameter.

Aspect 8: The method of aspect 7, wherein the quantity of the set of available resources is less than the resource quantity parameter, and wherein selecting the one or more resources further comprises: selecting the one or more resources uniformly at random from the set of available resources.

Aspect 9: The method of any of aspects 7 through 8, wherein the quantity of the set of available resources is greater than or equal to the resource quantity parameter, and wherein selecting the one or more resources further comprises: identifying, from the set of available resources, a subset of resources having a highest indication of reliability; and selecting the one or more resources uniformly at random from the subset of resources.

Aspect 10: The method of any of aspects 1 through 9, wherein the configuration indicates an RSRP value for each signal quality threshold of the plurality of signal quality thresholds.

Aspect 11: The method of any of aspects 1 through 10, wherein the configuration indicates an RSRP value for at least one signal quality threshold of the plurality of signal quality thresholds and an offset value for a remaining set of signal quality thresholds of the plurality of signal quality thresholds.

Aspect 12: The method of any of aspects 1 through 11, wherein the indicating further comprises: reporting the indication of availability and the indication of reliability of the availability from a lower layer of the UE to a higher layer of the UE.

Aspect 13: The method of any of aspects 1 through 12, wherein the control signaling comprises RRC signaling.

Aspect 14: An apparatus for wireless communications at a UE, comprising a processor; memory coupled with the processor; and instructions stored in the memory and executable by the processor to cause the apparatus to perform a method of any of aspects 1 through 13.

Aspect 15: An apparatus for wireless communications at a UE, comprising at least one means for performing a method of any of aspects 1 through 13.

Aspect 16: A non-transitory computer-readable medium storing code for wireless communications at a UE, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving control signaling indicating a configuration for identifying availability and reliability of the availability for resources of a sidelink resource pool based at least in part on a plurality of signal quality thresholds;
reporting, from a first layer of the UE to a second layer of the UE, for each resource of a set of resources of the sidelink resource pool and based at least in part on the configuration, an indicator comprising a plurality of bits, wherein a first bit of the plurality of bits comprises an indication of availability with respect to a first signal quality threshold of the plurality of signal quality thresholds and a second bit of the plurality of bits comprises an indication of reliability of the availability with respect to at least a second signal quality threshold of the plurality of signal quality thresholds; and
selecting, via the second layer of the UE, one or more resources of the sidelink resource pool based at least in part on the indication from the first layer of the UE indicating the availability and indicating the reliability of the availability for each resource of the set of resources.

2. The method of claim 1, wherein the reporting further comprises:
reporting the indication of the availability and the indication of reliability of the availability via a two bit indicator for each resource of the set of resources, a first bit of the two bit indicator comprising the indication of availability and a second bit of the two bit indicator comprising the indication of reliability of the availability, wherein the indicator comprising the plurality of bits is the two bit indicator.

3. The method of claim 1, further comprising:
measuring, for each resource of the set of resources, a signal quality measurement, wherein the indication of availability and the indication of reliability of the availability for each resource of the set of resources is based at least in part on the signal quality measurement.

4. The method of claim 3, wherein the reporting further comprises:
reporting the signal quality measurement for each resource of the set of resources, wherein the signal quality measurement indicates the availability and the reliability of the availability for each resource of the set of resources.

5. The method of claim 1, further comprising:
identifying, from the sidelink resource pool, a set of available resources based at least in part on the first signal quality threshold, wherein the set of resources of the sidelink resource pool comprise the set of available resources, and wherein the indication of availability and the indication of reliability of the availability for the set of resources both indicate a reliability of the availability for each resource of the set of available resources.

6. The method of claim 1, further comprising:
identifying, from the sidelink resource pool, a set of available resources based at least in part on the first signal quality threshold.

7. The method of claim 6, wherein the configuration indicates a resource quantity parameter, and wherein the selecting the one or more resources via the second layer of the UE further comprises:
determining a quantity of the set of available resources; and
selecting, via the second layer of the UE, the one or more resources from the set of available resources based at least in part on the quantity of the set of available resources and the resource quantity parameter.

8. The method of claim 7, wherein the quantity of the set of available resources is less than the resource quantity parameter, and wherein selecting the one or more resources further comprises:
selecting the one or more resources uniformly at random from the set of available resources.

9. The method of claim 7, wherein the quantity of the set of available resources is greater than or equal to the resource quantity parameter, and wherein selecting the one or more resources further comprises:
identifying, from the set of available resources, a subset of resources having a highest indication of reliability; and
selecting the one or more resources uniformly at random from the subset of resources.

10. The method of claim 1, wherein the configuration indicates a reference signal received power (RSRP) value for each signal quality threshold of the plurality of signal quality thresholds.

11. The method of claim 1, wherein the configuration indicates a reference signal received power (RSRP) value for at least one signal quality threshold of the plurality of signal quality thresholds and an offset value for a remaining set of signal quality thresholds of the plurality of signal quality thresholds.

12. The method of claim 1, wherein
the first layer of the UE is a lower layer of the UE and the second layer of the UE is a higher layer of the UE.

13. The method of claim 1, wherein the control signaling comprises radio resource control (RRC) signaling.

14. An apparatus for wireless communications at a user equipment (UE), comprising:
a processor;
memory coupled with the processor; and instructions stored in the memory and executable by the processor to cause the apparatus to:
receive control signaling indicating a configuration for identifying availability and reliability of the availability for resources of a sidelink resource pool based at least in part on a plurality of signal quality thresholds;
report, from a first layer of the UE to a second layer of the UE, for each resource of a set of resources of the sidelink resource pool and based at least in part on the configuration, an indicator comprising a plurality of bits, wherein a first bit of the plurality of bits of the indicator comprises an indication of availability with respect to a first signal quality threshold of the plurality of signal quality thresholds and a second bit of the plurality of bits of the indicator comprises an indication of reliability of the availability with respect to at least a second signal quality threshold of the plurality of signal quality thresholds; and
select, via the second layer of the UE one or more resources of the sidelink resource pool based at least in part on the indication from the first layer of the UE indicating the availability and indicating the reliability of the availability for each resource of the set of resources.

15. The apparatus of claim 14, wherein the instructions to report are further executable by the processor to cause the apparatus to:
report the indication of the availability and the indication of reliability of the availability via a two bit indicator for each resource of the set of resources, a first bit of the two bit indicator comprising the indication of availability and a second bit of the two bit indicator comprising the indication of reliability of the availability, wherein the indicator comprising the plurality of bits is the two bit indicator.

16. The apparatus of claim 14, wherein the instructions are further executable by the processor to cause the apparatus to:
measure, for each resource of the set of resources, a signal quality measurement, wherein the indication of availability and the indication of reliability of the availability for each resource of the set of resources is based at least in part on the signal quality measurement.

17. The apparatus of claim 16, wherein the instructions to report are further executable by the processor to cause the apparatus to:
report the signal quality measurement for each resource of the set of resources, wherein the signal quality measurement indicates the availability and the reliability of the availability for each resource of the set of resources.

18. The apparatus of claim 14, wherein the instructions are further executable by the processor to cause the apparatus to:
identify, from the sidelink resource pool, a set of available resources based at least in part on the first signal quality threshold, wherein the set of resources of the sidelink resource pool comprise the set of available resources, and wherein the indication of availability and the indication of reliability of the availability for the set of resources both indicate a reliability of the availability for each resource of the set of available resources.

19. The apparatus of claim 14, wherein the instructions are further executable by the processor to cause the apparatus to:
identify, from the sidelink resource pool, a set of available resources based at least in part on the first signal quality threshold.

20. The apparatus of claim 19, wherein the configuration indicates a resource quantity parameter, and wherein the instructions to select the one or more resources via the second layer of the UE are further executable by the processor to cause the apparatus to:
determine a quantity of the set of available resources; and
select, via the second layer of the UE, the one or more resources from the set of available resources based at least in part on the quantity of the set of available resources and the resource quantity parameter.

21. The apparatus of claim 20, wherein the quantity of the set of available resources is less than the resource quantity parameter, and wherein the instructions to select the one or more resources are further executable by the processor to cause the apparatus to:
select the one or more resources uniformly at random from the set of available resources.

22. The apparatus of claim 20, wherein the quantity of the set of available resources is greater than or equal to the resource quantity parameter, and wherein the instructions to select the one or more resources are further executable by the processor to cause the apparatus to:
identify, from the set of available resources, a subset of resources having a highest indication of reliability; and
select the one or more resources uniformly at random from the subset of resources.

23. The apparatus of claim 14, wherein the configuration indicates a reference signal received power (RSRP) value for each signal quality threshold of the plurality of signal quality thresholds.

24. The apparatus of claim 14, wherein the configuration indicates a reference signal received power (RSRP) value for at least one signal quality threshold of the plurality of signal quality thresholds and an offset value for a remaining set of signal quality thresholds of the plurality of signal quality thresholds.

25. The apparatus of claim 14, wherein
the first layer of the UE is a lower layer of the UE and the second layer of the UE is a higher layer of the UE.

26. The apparatus of claim 14, wherein:
the control signaling comprises radio resource control (RRC) signaling.

27. An apparatus for wireless communications at a user equipment (UE), comprising:
means for receiving control signaling indicating a configuration for identifying availability and reliability of the availability for resources of a sidelink resource pool based at least in part on a plurality of signal quality thresholds;
means for reporting, from a first layer of the UE to a second layer of the UE, for each resource of a set of resources of the sidelink resource pool and based at least in part on the configuration, an indicator comprising a plurality of bits, wherein a first bit of the plurality of bits of the indicator comprises an indication of availability with respect to a first signal quality threshold of the plurality of signal quality thresholds and a second bit of the plurality of bits of the indicator comprises an indication of reliability of the availability with respect to at least a second signal quality threshold of the plurality of signal quality thresholds; and
means for selecting, via the second layer of the UE, one or more resources of the sidelink resource pool based at least in part on the indication from the first layer of the UE indicating the availability and indicating the reliability of the availability for each resource of the set of resources.

28. The apparatus of claim 27, wherein the means for the reporting further comprise:
   means for reporting the indication of the availability and the indication of reliability of the availability via a two bit indicator for each resource of the set of resources, a first bit of the two bit indicator comprising the indication of availability and a second bit of the two bit indicator comprising the indication of reliability of the availability, wherein the indicator comprising the plurality of bits is the two bit indicator.

29. A non-transitory computer-readable medium storing code for wireless communications at a user equipment (UE), the code comprising instructions executable by a processor to:
   receive control signaling indicating a configuration for identifying availability and reliability of the availability for resources of a sidelink resource pool based at least in part on a plurality of signal quality thresholds;
   report, from a first layer of the UE to a second layer of the UE, for each resource of a set of resources of the sidelink resource pool and based at least in part on the configuration, an indicator comprising a plurality of bits, wherein a first bit of the plurality of bits of the indicator comprises an indication of availability with respect to a first signal quality threshold of the plurality of signal quality thresholds and a second bit of the plurality of bits of the indicator comprises an indication of reliability of the availability with respect to at least a second signal quality threshold of the plurality of signal quality thresholds; and
   select, via the second layer of the UE one or more resources of the sidelink resource pool based at least in part on the indication from the first layer of the UE indicating the availability and indicating the reliability of the availability for each resource of the set of resources.

30. The non-transitory computer-readable medium of claim 29, wherein the instructions to report are further executable by the processor to:
   report the indication of the availability and the indication of reliability of the availability via a two bit indicator for each resource of the set of resources, a first bit of the two bit indicator comprising the indication of availability and a second bit of the two bit indicator comprising the indication of reliability of the availability, wherein the indicator comprising the plurality of bits is the two bit indicator.

* * * * *